United States Patent
Oda et al.

(10) Patent No.: US 10,632,488 B1
(45) Date of Patent: Apr. 28, 2020

(54) AEROSOL GENERATING DEVICE, CONTROL UNIT FOR AEROSOL GENERATING DEVICE, METHOD, AND PROGRAM

(71) Applicant: JAPAN TOBACCO INC., Tokyo (JP)

(72) Inventors: Takashi Oda, Tokyo (JP); Hiroshi Okuno, Tokyo (JP); Takeshi Akao, Tokyo (JP); Hajime Fujita, Tokyo (JP)

(73) Assignee: JAPAN TOBACCO INC., Tokyo (JP)

( * ) Notice: Subject to any disclaimer, the term of this patent is extended or adjusted under 35 U.S.C. 154(b) by 0 days.

(21) Appl. No.: 16/571,964

(22) Filed: Sep. 16, 2019

(30) Foreign Application Priority Data

Oct. 3, 2018 (JP) .................................. 2018-188631

(51) Int. Cl.
*H01M 10/44* (2006.01)
*H01M 10/46* (2006.01)
(Continued)

(52) U.S. Cl.
CPC ............ *B05B 12/08* (2013.01); *A24F 47/008* (2013.01)

(58) Field of Classification Search
CPC ........ H02J 7/0026; H02J 7/0021; H02J 7/355; H02J 7/0042; H02J 7/0081; H02J 7/007; H02J 7/04; H02J 7/045
(Continued)

(56) References Cited

U.S. PATENT DOCUMENTS 6,968,137 B2 * 11/2005 Tatematsu .......... G03G 15/2039
219/216
2012/0310512 A1 * 12/2012 Aoki .................... F02D 41/1495
701/108
(Continued)

FOREIGN PATENT DOCUMENTS

JP       2009-140630 A      6/2009
JP       2014-150623 A      8/2014
(Continued)

OTHER PUBLICATIONS

Reason for Rejection issued in Japanese Patent Application No. 2018-188631 dated Apr. 12, 2019.
(Continued)

*Primary Examiner* — Edward Tso
(74) *Attorney, Agent, or Firm* — Birch, Stewart, Kolasch & Birch, LLP

(57) ABSTRACT

A control unit for an aerosol generating device includes: a sensor that outputs a value related to a temperature of a power source capable of being charged and discharged to a load for atomizing an aerosol source; and a controller configured to execute one or more functions of operating the power source when an output value of the sensor is within a first range having at least one of a first upper limit and a first lower limit. The first upper limit or the first lower limit is smaller or larger than a second upper limit or a second lower limit of a second range that is a range of a value related to a temperature at which the one or more functions
(Continued)

can be executed, a range of a value related to a temperature at which deterioration of the power source is suppressed, a range of a value related to a temperature at which the power source deteriorates due only to a factor that is the same as normal temperature, or a range corresponding to an operating temperature of the power source.

26 Claims, 16 Drawing Sheets

(51) Int. Cl.
  *B05B 12/08*   (2006.01)
  *A24F 47/00*   (2020.01)

(58) Field of Classification Search
  USPC .................. 320/114, 115, 132, 148, 162
  See application file for complete search history.

(56) References Cited

U.S. PATENT DOCUMENTS

| | | |
|---|---|---|
| 2015/0237917 A1 | 8/2015 | Lord |
| 2017/0033568 A1 | 2/2017 | Holzherr |
| 2017/0119052 A1 | 5/2017 | Williams et al. |
| 2017/0214261 A1 | 7/2017 | Gratton |
| 2018/0140013 A1 | 5/2018 | Sur et al. |
| 2018/0358663 A1 | 12/2018 | Yonemoto et al. |

FOREIGN PATENT DOCUMENTS

| | | |
|---|---|---|
| JP | 2017-79747 A | 5/2017 |
| JP | 2017-518733 A | 7/2017 |
| WO | WO 2017/038387 A1 | 3/2017 |

OTHER PUBLICATIONS

Reason for Rejection issued in Japanese Patent Application No. 2018-188631 dated Dec. 12, 2018.
Extended European Search Report for European Application No. 19200771.4, dated Feb. 28, 2020.

* cited by examiner

AEROSOL GENERATING DEVICE, CONTROL UNIT FOR AEROSOL GENERATING DEVICE, METHOD, AND PROGRAM

TECHNICAL FIELD

The invention relates to an aerosol generating device, a control unit for the aerosol generating device, a method, and a program.

BACKGROUND ART

In place of cigarettes, aerosol generating devices are known with which aerosol is generated for tasting by atomizing an aerosol source with an electric load such as a heater (PTL 1 and PTL 2). The aerosol generating device includes a heating element that atomizes an aerosol source, a power source that supplies power to the heating element, and a controller that controls the heating element and the power source.

PTL 1 discloses an aerosol generating device including a temperature sensor configured to measure an ambient temperature during use. In the device disclosed in PTL 1, the device stays in a standby mode after measurement of the temperature when the temperature measured by the temperature sensor exceeds a threshold during use, or the device ends the standby mode when the temperature falls below the threshold. In addition, PTL 1 discloses a case where the device is disabled when the temperature measured by the temperature sensor exceeds a limited threshold during use.

PTL 2 discloses a method of charging a power source mounted on an aerosol generating device. PTL 2 also discloses a case of changing a rate of a charging current supplied to the power source or prohibiting charging according to the ambient temperature.

CITATION LIST

Patent Literature

PTL 1: Japanese Patent laid-open No. 2017-079747
PTL 2: National Publication of International Patent Application No. 2017-518733

SUMMARY OF INVENTION

A first feature is a control unit for an aerosol generating device including: a sensor that outputs a value related to a temperature of a power source capable of being charged and discharged to a load for atomizing an aerosol source; and a controller configured to execute one or more functions of operating the power source when an output value of the sensor is within a first range having at least one of a first upper limit and a first lower limit. The first upper limit or the first lower limit is smaller or larger than a second upper limit or a second lower limit of a second range that is a range of a value related to a temperature at which the one or more functions can be executed, a range of a value related to a temperature at which deterioration of the power source is suppressed, a range of a value related to a temperature at which the power source deteriorates due only to a factor that is the same as normal temperature, or a range corresponding to an operating temperature of the power source.

Here, the value related to the temperature may be a temperature itself, or may be a physical quantity different from the temperature, for example, a physical quantity that can be converted into temperature. In other words, the value related to the temperature may be a physical quantity having a correlation with temperature. The physical quantity that can be converted into temperature or has a correlation with temperature may be, for example, an electric resistance value of a resistor, which is provided near the power source or attached to the surface of the power source, or a voltage drop amount (potential difference) in the resistor. The sensor may be any sensor such as a thermistor as long as it can acquire a value related to the temperature of the power source. For example, when the value related to the temperature of the power source is the temperature itself, the sensor may be a temperature sensor. When the value related to the temperature of the power source is the voltage drop amount, the sensor may be a voltage sensor.

Here, the one or more functions of operating the power source refers to one or more functions which has directly or indirectly influence on the power source when being executed. Examples of such one or more functions may include charge/discharge used to change the remaining capacity of the power source and detection or estimation of the state of the power source used as an input for control affecting the power source. Note that since the temperature of the power source has already been acquired before execution of the one or more functions, acquisition of the temperature of the power source is excluded from such one or more functions.

A second feature is the control unit for an aerosol generating device according to the first feature, wherein the first range includes the first upper limit, and the first upper limit is smaller than the second upper limit.

A third feature is the control unit for an aerosol generating device according to the first or second feature, wherein the first range includes the first lower limit, and the first lower limit is larger than the second lower limit.

A fourth feature is the control unit for an aerosol generating device according to any one of the first to third features, wherein the first range includes the first upper limit and the first lower limit, and a sign of a difference between the second upper limit and the first upper limit differs from a sign of a difference between the second lower limit and the first lower limit.

A fifth feature is the control unit for an aerosol generating device according to any one of the first to fourth features, wherein at least one of an absolute value of a difference between the second upper limit and the first upper limit and an absolute value of a difference between the second lower limit and the first lower limit is equal to or larger than a maximum error value of an output value with respect to an input value of the sensor.

A sixth feature is the control unit for an aerosol generating device according to any one of the first to fifth features, wherein the controller makes at least one of the first upper limit and the first lower limit variable.

A seventh feature is the control unit for an aerosol generating device according to any one of the first to sixth features, wherein the sensor is disposed in or near an electronic component that is provided separately from the power source, and a distance between the sensor and the electronic component is shorter than a distance between the sensor and the power source.

An eighth feature is the control unit for an aerosol generating device according to the seventh feature, wherein at least one of the absolute value of a difference between the second upper limit and the first upper limit and the absolute value of a difference between the second lower limit and the first lower limit is equal to or larger than an amount of change corresponding to a temperature change until the temperature of the power source is transmitted to the sensor or the electronic component.

A ninth feature is the control unit for an aerosol generating device according to the seventh feature, wherein at least one of the absolute value of a difference between the second upper limit and the first upper limit and the absolute value of a difference between the second lower limit and the first lower limit is equal to or larger than an absolute value of a difference between the output value of the sensor having no error and a value corresponding to a true value of the temperature of the power source.

A tenth feature is the control unit for an aerosol generating device according to the seventh feature, wherein at least one of the absolute value of a difference between the second upper limit and the first upper limit and the absolute value of a difference between the second lower limit and the first lower limit is equal to or larger than a value obtained by adding an amount of change corresponding to a temperature change until the temperature of the power source is transmitted to the sensor or the electronic component, or an absolute value of a difference between the output value of the sensor having no error and a value corresponding to a true value of the temperature of the power source to the maximum error value of the output value with respect to an input value of the sensor.

An eleventh feature is the control unit for an aerosol generating device according to any one of the seventh to tenth features, wherein the electronic component is the controller, and the controller is configured to adjust at least one of a difference between the second upper limit and the first upper limit and a difference between the second lower limit and the first lower limit, based on a calculation amount per predetermined time of the controller.

A twelfth feature is the control unit for an aerosol generating device according to any one of the seventh to tenth features, wherein the controller is configured to adjust at least one of a difference between the second upper limit and the first upper limit and a difference between the second lower limit and the first lower limit, based on the output value of the sensor.

A thirteenth feature is the control unit for an aerosol generating device according to any one of the first to twelfth features, wherein the one or more functions includes at least one of a discharge, a charge, and deterioration diagnosis of the power source.

A fourteenth feature is the control unit for an aerosol generating device according to any one of the first to thirteenth features, wherein the second upper limit is a temperature at which a change in structure or composition of an electrode or an electrolyte occurs in the power source.

A fifteenth feature is the control unit for an aerosol generating device according to any one of the first to fourteenth features, wherein the one or more functions includes at least one of the discharge and the deterioration diagnosis of the power source, and the second upper limit is 60° C.

A sixteenth feature is the control unit for an aerosol generating device according to any one of the first to fifteenth features, wherein the one or more functions includes at least one of the discharge and the deterioration diagnosis of the power source, and the first upper limit is 54° C.

A seventeenth feature is the control unit for an aerosol generating device according to any one of the first to fourteenth features, wherein the one or more functions is to charge the power source, and the second upper limit is 45° C.

An eighteenth feature is the control unit for an aerosol generating device according to any one of the first to fourteenth, and seventeenth features, wherein the one or more functions is to charge the power source, and the first upper limit is 39° C.

A nineteenth feature is the control unit for an aerosol generating device according to any one of the first to sixteenth features, wherein the one or more functions is to charge the power source, and the second lower limit is a temperature at which electrodeposition occurs in the power source.

A twentieth feature is the control unit for an aerosol generating device according to any one of the first to sixteenth, and nineteenth features, wherein the second lower limit is 0° C.

A twenty-first feature is the control unit for an aerosol generating device according to any one of the first to sixteenth, nineteenth, and twentieth features, wherein the first lower limit is 6° C.

A twenty-second feature is the control unit for an aerosol generating device according to any one of the first to sixteenth, and nineteenth features, wherein the one or more functions includes at least one of a discharge and deterioration diagnosis of the power source, and the second lower limit is −10° C.

A twenty-third feature is the control unit for an aerosol generating device according to any one of the first to sixteenth, nineteenth, and twentieth features, wherein the one or more functions includes at least one of a discharge and deterioration diagnosis of the power source, and the first lower limit is −4° C.

A twenty-fourth feature is the control unit for an aerosol generating device according to any one of the first to twenty-third features, wherein the controller is configured to be capable of executing a plurality of the functions, and the first range is different for each of the functions.

A twenty-fifth feature is the control unit for an aerosol generating device according to any one of the first to twenty-fourth features, wherein the controller is configured to be capable of executing a plurality of the functions, and at least one of the first upper limit, the first lower limit, the second upper limit, the second lower limit, the difference between the second upper limit and the first upper limit, and the difference between the second lower limit and the first lower limit are the same in a plurality of the functions.

A twenty-sixth feature is an aerosol generating device including: the control unit according to any one of the first to twenty-fifth features; the load that atomizes the aerosol source.

A twenty-seventh feature is a method including: acquiring or estimating a value related to a temperature of a power source capable of being charged and discharged to a load for atomizing an aerosol source; and executing one or more functions of operating the power source when the value related to the temperature of the power source is within a first range having at least one of a first upper limit and a first lower limit. The first upper limit or the first lower limit is smaller or larger than a second upper limit or a second lower limit of a second range that is a range of a value related to a temperature at which the one or more functions can be executed, a range of a value related to a temperature at which deterioration of the power source is suppressed, a range of a value related to a temperature at which the power source deteriorates due only to a factor that is the same as normal temperature, or a range corresponding to an operating temperature of the power source.

A twenty-eighth feature is a program for causing a computer to execute the method according to the twenty-seventh feature.

DESCRIPTION OF EMBODIMENTS

Figure 1:
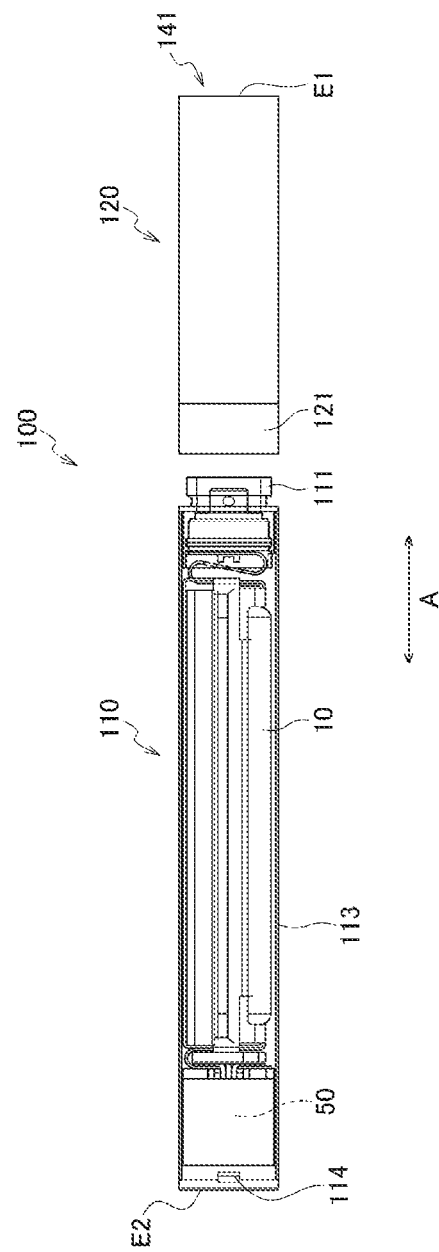
FIG. 1 is an exploded view of an aerosol generating device according to a first embodiment.

Embodiments will be described below. Note that the same or similar parts are denoted with the same or similar reference signs in the description of the drawings below. It should be noted that the drawings are schematic and each ratio in dimension may be different from an actual ratio.

Therefore, for example, specific dimensions should be judged in consideration of the following description. Needless to say, the drawings may include parts which are different, in terms of the relation or ratio in dimension, from each other.

[Overview of Disclosure]

According to one aspect, a control unit for an aerosol generating device includes: a sensor that outputs a value related to a temperature of a power source capable of being charged and discharged to a load for atomizing an aerosol source; and a controller configured to execute one or more functions of operating the power source when an output value of the sensor is within a first range having at least one of a first upper limit and a first lower limit. The first upper limit or the first lower limit is smaller or larger than a second upper limit or a second lower limit of a second range that is a range of a value related to a temperature at which the one or more functions can be executed, a range of a value related to a temperature at which deterioration of the power source is suppressed, a range of a value related to a temperature at which the power source deteriorates due only to a factor that is the same as normal temperature, or a range corresponding to an operating temperature of the power source.

Since the temperature sensor has inevitable measurement errors and product errors, the output value of the temperature sensor may deviate from a true value of the temperature of the power source. In the following, unless otherwise specified, "the true value of the temperature of the power source" indicates an accurate value of the temperature of the power source. In other words, an output value of an ideal temperature sensor having no measurement errors or product errors matches "the true value of the temperature of the power source". Therefore, assuming that the one or more functions of operating the power source is executed when the output value of the sensor is within the second range, the one or more functions of operating the power source may be executed when the true value of the power source is outside the second range. It should be noted that a similar problem can occur even when the temperature sensor does not directly output the temperature of the power source.

In this aspect, according to deviation between the output value of the temperature sensor and the true value of the temperature of the power source, the controller executes the one or more functions of operating the power source when the output value of the temperature sensor is within the first range deviated from the second range. Thus, only when the temperature of the power source is within a more suitable range the controller can execute the one or more functions of the operating the power source.

First Embodiment

Figure 2:
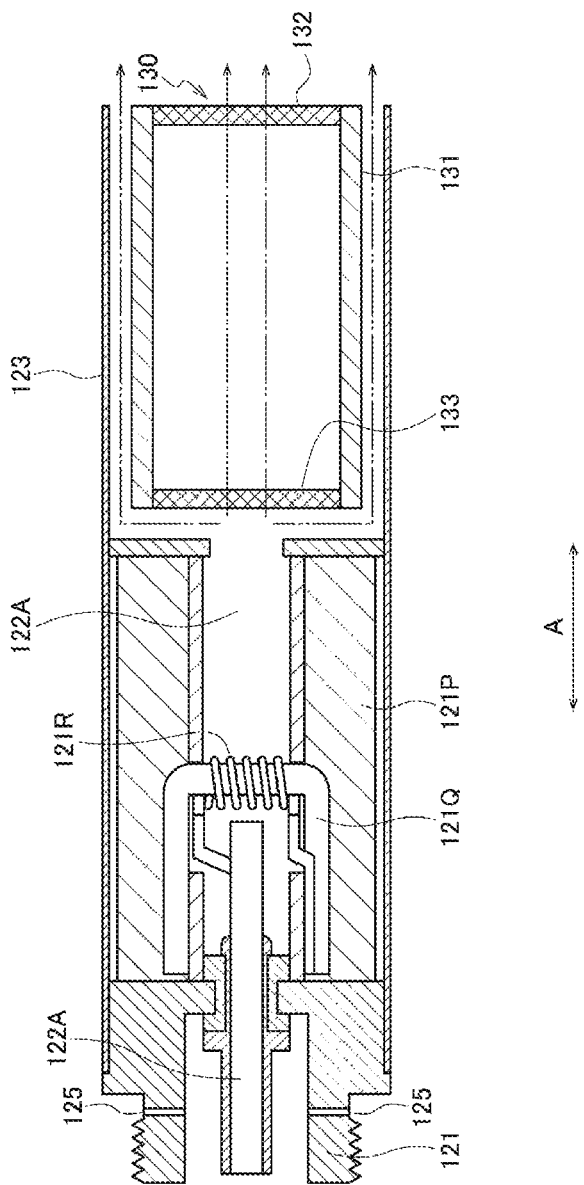
FIG. 2 is a view illustrating an atomization unit according to the first embodiment.
Figure 3:
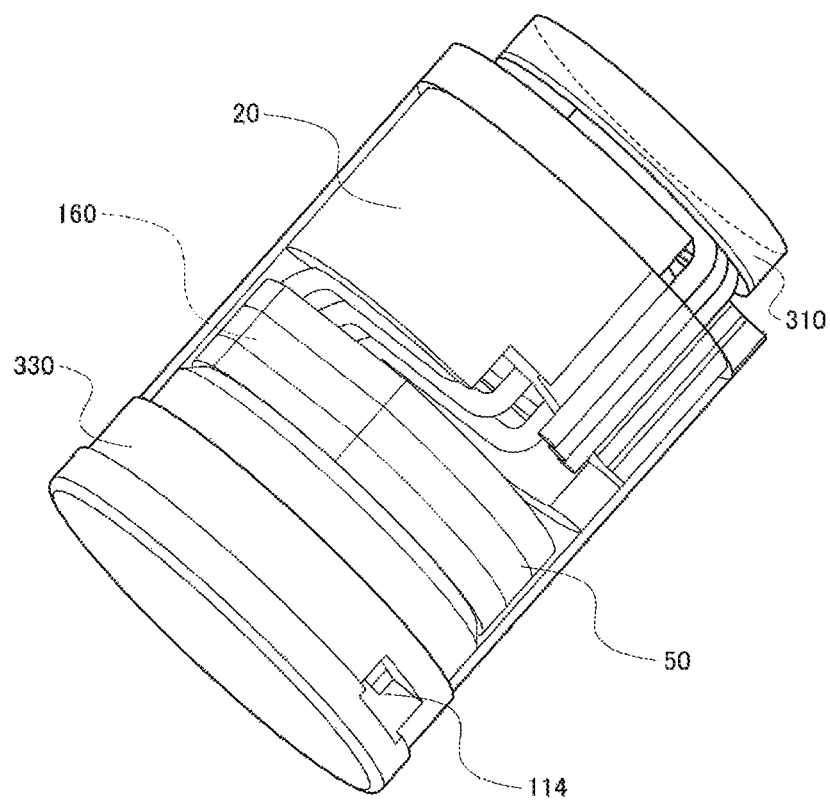
FIG. 3 is an enlarged perspective view of a part of a power source unit.
Figure 4:
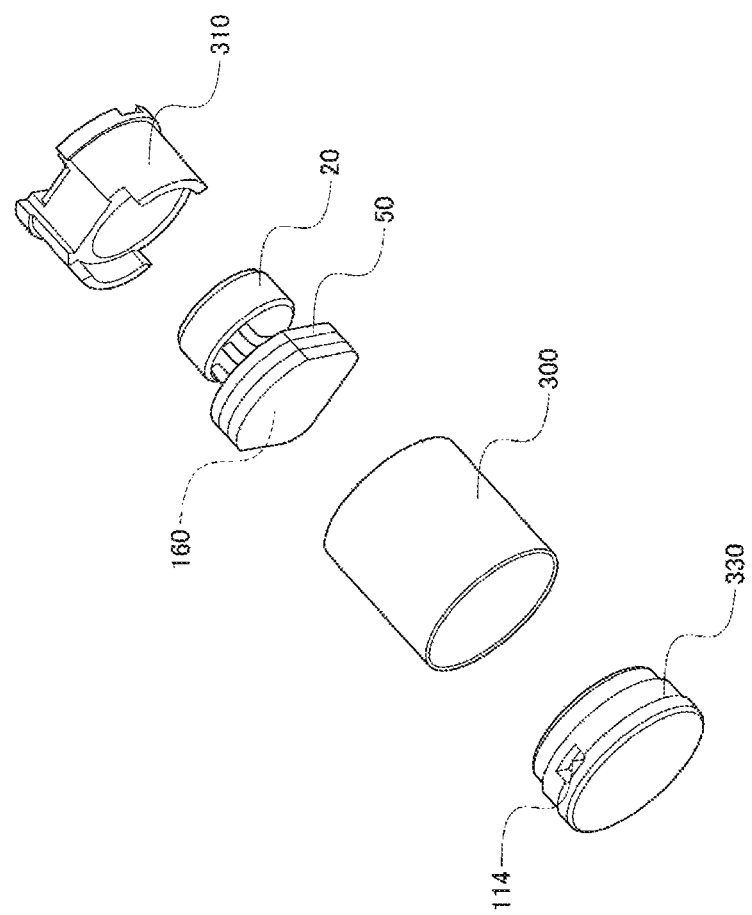
FIG. 4 is an exploded perspective view in which the part of the power source unit is disassembled.
Figure 5:
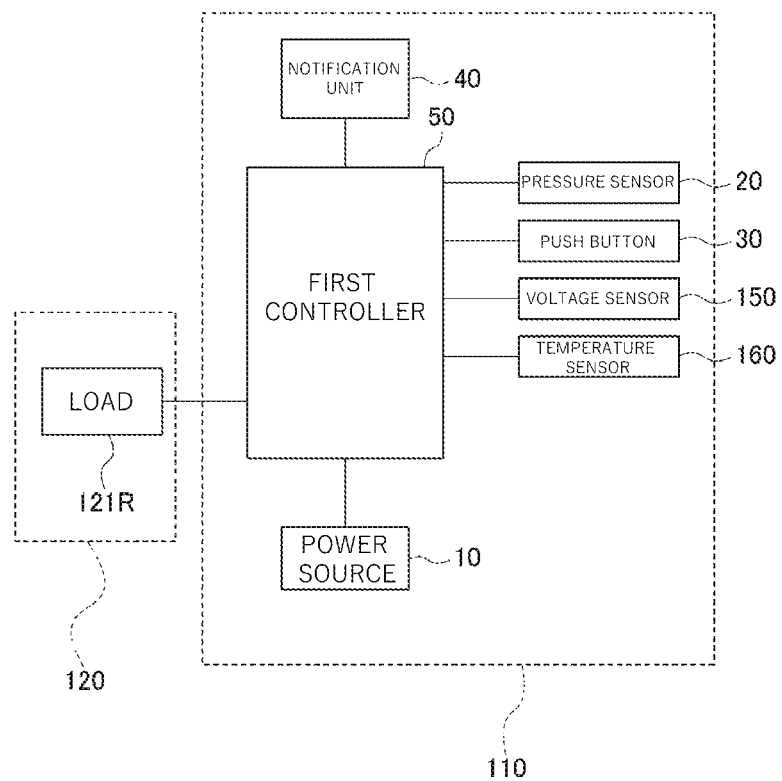
FIG. 5 is a block diagram of the aerosol generating device.
Figure 6:
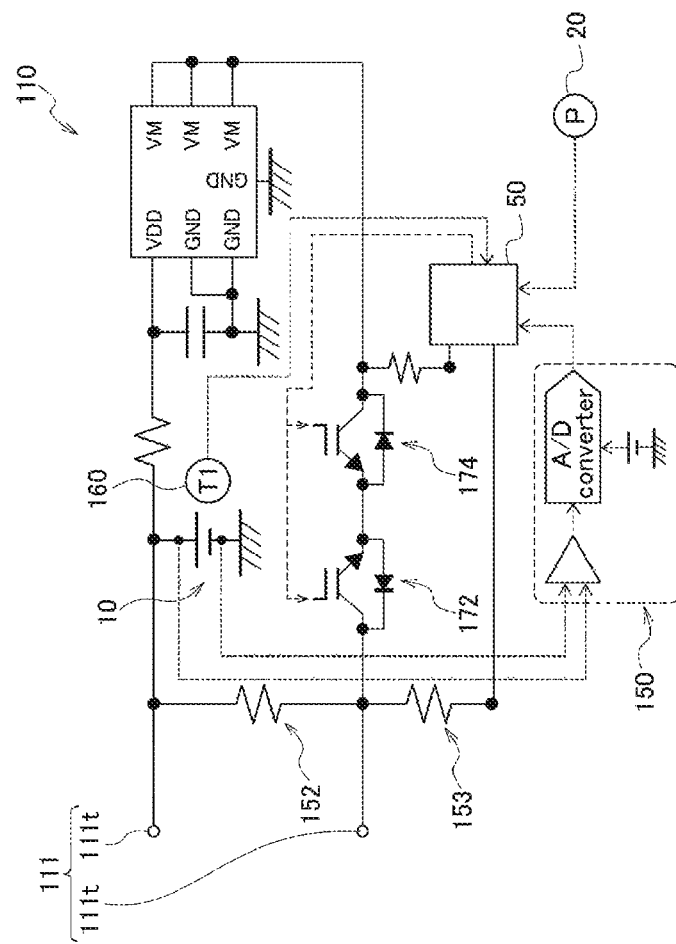
FIG. 6 is a view illustrating an electric circuit of the power source unit.
Figure 7:
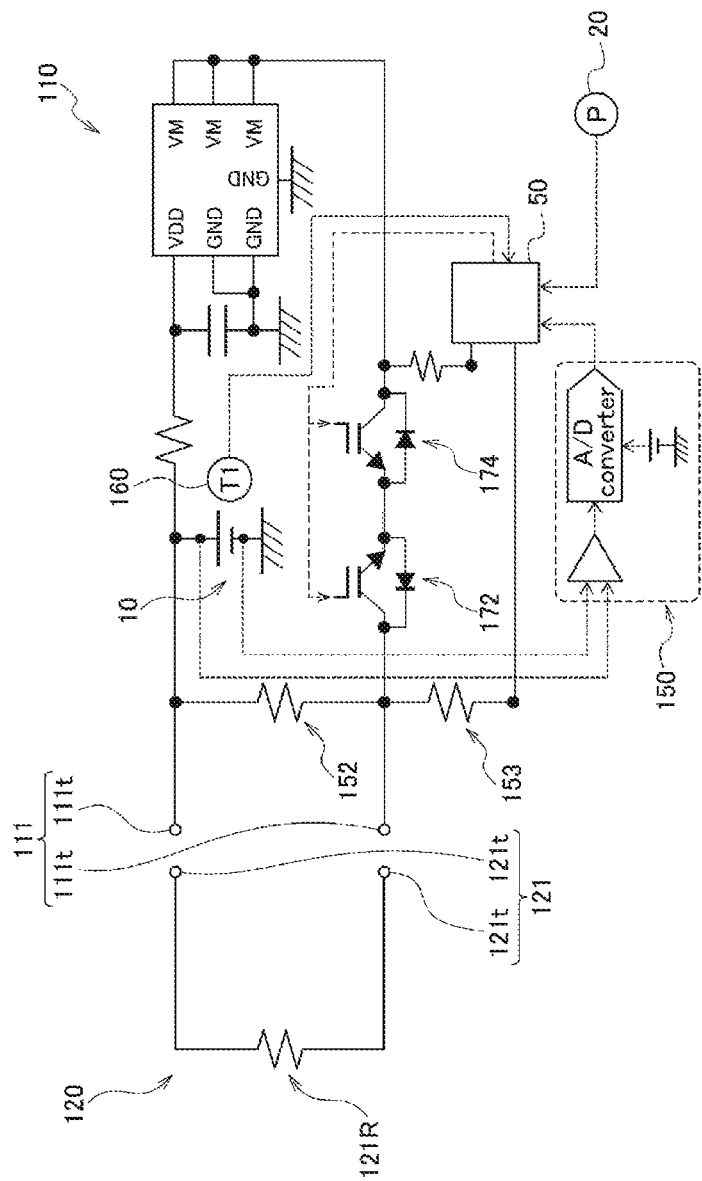
FIG. 7 is a view illustrating an electric circuit of the atomization unit including a load and the power source unit.

In the following, an aerosol generating device according to a first embodiment will be described. FIG. 1 is an exploded view of the aerosol generating device according to an embodiment. FIG. 2 is a view illustrating an atomization unit according to an embodiment. FIG. 3 is an enlarged perspective view of a part of a power source unit. FIG. 4 is an exploded perspective view in which the part of the power source unit is disassembled. FIG. 5 is a block diagram of the aerosol generating device. FIG. 6 is a view illustrating an electric circuit of the power source unit. FIG. 7 is a view illustrating an electric circuit of the atomization unit including a load and the power source unit.

An aerosol generating device 100 may be a non-combustion-type inhaler with which a user inhales an aerosol without combustion. More preferably, the aerosol generating device 100 may be a portable inhaler.

The aerosol generating device 100 may have a shape extending along a predetermined direction A that is a direction toward a mouthpiece end E1 from a non-mouthpiece end E2. In this case, the aerosol generating device 100 may include one end E1 having a mouthpiece port 141 through which a user inhales a flavor and the other end E2 on a side opposite to the mouthpiece port 141.

The aerosol generating device 100 may include a power source unit 110 and an atomization unit 120. The atomization unit 120 may include a case 123 and a load 121R disposed inside the case 123. The case 123 may form a part of the outermost outer surface of the aerosol generating device.

The atomization unit 120 may be configured to be attachable to and detachable from the power source unit 110 via mechanical connection portions 111 and 121. When the atomization unit 120 and the power source unit 110 are mechanically connected to each other, the load 121R disposed in the atomization unit 120 is electrically connected to a power source 10 provided in the power source unit 110 via electric connection terminals (first connection portion) 111t and 121t. That is, the electric connection terminals 111t and 121t form a connection portion through which the load 121R and the power source 10 can be electrically connected to each other.

The atomization unit 120 includes an aerosol source that is inhaled by a user and the electric load 121R used to atomize the aerosol source with power supplied from the power source 10.

The load 121R may be an element that can generate aerosol from the aerosol source using power supplied from the power source. For example, the load 121R may be a heating element such as a heater or an element such as an ultrasonic generator. Examples of the heating element may include a heating resistor, a ceramic heater, and an induction-heating-type heater.

Hereinafter, a more detailed example of the atomization unit 120 will be described with reference to FIGS. 1 and 2. The atomization unit 120 may include a reservoir 121P, a wick 121Q, and a load 121R. The reservoir 121P may be configured to reserve a liquid aerosol source. The reservoir 121P may be a porous body made of a material such as a resin web, for example. The wick 121Q may be a liquid retaining member that draws the aerosol source from the reservoir 121P using a capillary phenomenon. The wick 121Q can be made of, for example, glass fiber or porous ceramic.

The load 121R heats the aerosol source retained in the wick 121Q. The load 121R is formed by, for example, a resistance heating element (for example, a heating wire) wound around the wick 121Q.

Air flowing from an inlet 125, which takes in outside air into a flow path, passes near the load 121R in the atomization unit 120 through a flow path 122A. The aerosol generated by the load 121R flows toward the mouthpiece port 141 together with the air. Hereinafter, the flow path 122A refers to a path between the inlet 125 and the mouthpiece port 141, among paths through which a fluid can flow. That is, the flow path 122A passes an air flow generated by user's inhalation. In this embodiment, the flow path 122A reaches the mouthpiece port 141 through the atomization unit 120 from the connection portion between the atomization unit 120 and the power source unit 110.

In the embodiment described above, the inlet 125 is provided at the connection portion 121 of the atomization unit 120. Unlike the embodiment, the inlet 125 may be provided at the connection portion 111 of the power source unit 110. Unlike the embodiment, the inlet 125 may be also provided at the connection portion 121 of the atomization unit 120 and the connection portion 111 of the power source unit 110. In any case, the inlet 125 is provided at the connection portion between the atomization unit 120 and the power source unit 110.

The aerosol source may be a liquid at normal temperature. Examples of the aerosol source to be used can include polyhydric alcohols such as glycerin and propylene glycol. The aerosol source may contain a tobacco raw material and an extract derived from the tobacco raw material that release flavor ingredients by heating.

The liquid aerosol source at normal temperature is described in detail as an example in the embodiment described above, but a solid aerosol source at normal temperature can be used. In this case, the load 121R may be in contact with or close to the solid aerosol source so as to generate aerosol from the solid aerosol source.

The atomization unit 120 may include a flavor unit (cartridge) 130 configured to be replaceable. The flavor unit 130 may include a cylindrical body 131 that accommodates the flavor source. The cylindrical body 131 may include a membrane member 133 and a filter 132 through which air or aerosol can pass. The flavor source may be provided in a space formed by the membrane member 133 and the filter 132.

According to an example of a preferred embodiment, the flavor source in the flavor unit 130 adds flavor ingredients to the aerosol generated by the load 121R of the atomization unit 120. The flavor added to the aerosol by the flavor source is carried to the mouthpiece port 141 of the aerosol generating device 100.

The flavor source in the flavor unit 130 may be solid at normal temperature. As an example, the flavor source includes a plant material piece that adds flavor ingredients to the aerosol. As the raw material piece included in the flavor source, a compact obtained by forming a tobacco material such as cut tobacco or a tobacco raw material into a granular shape may be used. Alternatively, the flavor source may be a compact obtained by forming a tobacco material into a sheet shape. In addition, the raw material piece included in the flavor source may be formed by plants (for example, mint and herb) other than tobacco. The flavor source may be added with a flavoring agent such as menthol.

The aerosol generating device 100 may include a mouthpiece having an inhalation port for a user to inhale an inhalant. The mouthpiece may be configured to be attachable to and detachable from the atomization unit 120 or the flavor unit 130, or may be configured integrally with them. The flavor unit 130 may serve as a mouthpiece when a part of the flavor unit 130 including the filter 132 is exposed from the case 123.

A more detailed example of the power source unit 110 will be described below with reference to FIGS. 1, 3, and 4. The power source unit 110 may include a case 113, a power source 10, a pressure sensor 20, a control unit, and a temperature sensor 160. The power source 10, the pressure sensor 20, the control unit, and the temperature sensor 160 may be provided in the case 113. The case 113 may form a part of the outermost outer surface of the aerosol generating device.

As described above, the power source 10 is configured to be electrically connected to or connectable to the load 121R that atomizes the aerosol source. That is, the power source 10 is dischargeable to the load 121R. The power source 10 may be replaceable with respect to the power source unit 110. The power source 10 may be, for example, a rechargeable secondary battery such as a lithium-ion secondary battery.

The secondary battery may include a positive electrode, a negative electrode, a separator that separates the positive electrode and the negative electrode, and an electrolyte or an ionic liquid. In the lithium-ion secondary battery, the positive electrode is formed of, for example, a positive electrode material such as a lithium oxide; and the negative electrode is formed of, for example, a negative electrode material such as graphite. The electrolyte may be, for example, a lithium salt organic solvent.

The pressure sensor 20 is configured to output a value of a pressure change in the aerosol generating device 100 generated by user's inhalation or blowing through the mouthpiece port 141. Specifically, the pressure sensor 20 may be a sensor that outputs an output value (for example, a voltage value or a current value) according to air pressure that changes depending on a flow rate (that is, user's puffing) of air to be inhaled toward the mouthpiece side from the non-mouthpiece side. The output value of the pressure sensor 20 may have a pressure dimension, or may have a flow rate or a flow velocity of air to be inhaled instead of the pressure dimension. Examples of such a pressure sensor may include a capacitor microphone sensor and a known flow rate sensor.

The control unit may include a control board, a CPU, and a memory. The CPU and the memory form a first controller 50 that performs various controls of the aerosol generating device 100. For example, the first controller 50 may control the power supplied to the load 121R. The aerosol generating device 100 may include a first switch 172 that can electrically connect and disconnect the load 121R and the power source 10 (see FIG. 6). The first switch 172 is opened and closed by the first controller 50. The first switch 172 may be formed by a MOSFET, for example.

When the first switch 172 is turned on, power is supplied to the load 121R from the power source 10. On the other hand, when the first switch 172 is turned off, the supply of the power from the power source 10 to the load 121R is stopped. The first switch 172 is turned on and off by the first controller 50.

The power source unit 110 may include a request sensor capable of outputting an operation request signal that is a signal for requesting the operation of the load 121R. The request sensor may be, for example, a push button 30 pressed by the user or the pressure sensor 20 described above. The first controller 50 acquires an operation request signal for the load 121R and generates a command for operating the load 121R. In an example, the first controller 50 outputs a command for operating the load 121R to the first switch 172, and the first switch 172 is turned on in response to the command. In this way, the first controller 50 may be configured to control power supply from the power source 10 to the load 121R. When power is supplied to the load 121R from the power source 10, the aerosol source is vaporized or atomized by the load 121R.

Further, the power source unit 110 may include, as necessary, a voltage sensor 150 that can acquire or estimate the output voltage of the power source 10. In this case, the first controller 50 performs a predetermined control according to the output value of the voltage sensor 150. For example, the first controller 50 can detect or estimate the remaining amount of the power source 10 or abnormality of the power source 10 based on the output value of the voltage sensor 150. When detecting a low remaining amount of the power source 10 or abnormality of the power source 10, the first controller 50 may notify the user of the detected information by controlling a notification unit 40.

The voltage sensor 150 may be configured to convert an analog voltage value of the power source 10 into a digital voltage value using a predetermined correlation and to output the digital voltage value. Specifically, the voltage sensor 150 may include an A/D converter that converts an analog input value into a digital output value. Instead of the voltage sensor 150, the first controller 50 may include an A/D converter.

In the embodiment, the power source unit 110 may include a first resistor 152 and a second resistor 153 that are electrically connected in series with each other. The first resistor 152 is electrically connected to the power source 10 and is provided to connect a pair of electric terminals 111*t* to each other. One end of the second resistor 153 is connected to the first resistor 152, and the other end of the second resistor 153 is connected to the first controller 50. Electric resistance values of the first resistor 152 and the second resistor 153 are known. Preferably, the electric resistance values of the first resistor 152 and the second resistor 153 may be constant regardless of the state of the power source 10. These resistors 152 and 153 can be used to detect connection of external units to the electric terminals 111*t*.

The notification unit 40 issues a notification for notifying the user of various types of information. The notification unit 40 may be, for example, a light emitting element such as an LED. Alternatively, the notification unit 40 may be an acoustic element that generates sound or a vibrator that generates vibration. Furthermore, the notification unit 40 may be configured by any combination of the light emitting element, the acoustic element, and the vibrator. The notification unit 40 may be provided at any location of the aerosol generating device 100. In the embodiment, the notification unit 40 may be built in the first controller 50, or may be disposed at a location different from the first controller 50. The notification unit 40 may be provided anywhere as long as the user can recognize the notification by the notification unit 40.

The power source unit 110 may include a sensor that outputs a value related to a temperature of the power source 10. Such a sensor is preferably the temperature sensor 160 described above. The output value of the temperature sensor 160 is sent to the first controller 50.

The temperature sensor 160 may be provided anywhere as long as the temperature of the power source 10 can be acquired or estimated. The temperature sensor 160 may be disposed in or near an electronic component that is provided separately from the power source 10. In this case, a distance between the temperature sensor 160 and the electronic component may be shorter than a distance between the temperature sensor 160 and the power source 10. Such an electronic component may be the first controller 50. For example, the temperature sensor 160 may be built in the first controller 50.

In an aspect illustrated in FIGS. 3 and 4, the power source unit 110 includes a first member 300 and a second member 310 that cover the pressure sensor 20, the temperature sensor 160, and the first controller 50. The first member 300 and the second member 310 are formed in a cylindrical shape. The second member 310 is fitted to one end of the first member 300. A cap 330 is provided at the other end of the first member 300. The cap 330 may be formed with an opening 114 that is opened to the atmosphere. Thus, the inside of the first member 300 and the second member 310 is opened to the atmosphere.

The power source unit 110 may be configured to be connectable to a charging unit that can charge the power source 10. In an example illustrated in FIG. 6, electric terminals of the charging unit are electrically connected to the pair of electric terminals 111*t* of the power source unit 110. When the charging unit is connected to the power source unit 110, the charging unit supplies a charging current toward the power source 10. In this case, the first controller 50 may include a conversion unit that can convert a power value and/or a current value of the charging current and output the converted value to the power source 10. Such a conversion unit may include a DC/DC converter capable of increasing and/or decreasing a DC voltage. Thus, the first controller 50 can change a charging rate (charging speed) of the power source 10.

In the embodiment, the charging unit may be electrically connected to the power source unit 110 by the pair of connection terminals 111*t*. Alternatively, the power source unit 110 may separately include a dedicated port for connection of the charging unit. The charging unit may not be always mechanically connected to the power source unit 110. As another example, the charging unit may be configured to charge the power source unit 110 by wireless charging or contactless charging.

The power source unit 110 may include a second switch 174 between the power source 10 and the electric connection terminal 111*t*. The second switch 174 is opened and closed by the first controller 50. The second switch 174 may be formed by a MOSFET, for example. The second switch 174 is turned on and off by the first controller 50.

When the second switch 174 is turned on, the charging current can flow to the power source 10 from the charging unit. When the second switch 174 is turned off, the charging current can hardly flow to the power source 10 from the charging unit. That is, even when the charging unit is connected to the power source unit 110, the first controller 50 can temporarily or permanently stop the charge of the power source 10 with the second switch 174.

The first controller 50 may be configured to be capable of determining whether the charging unit is connected. The first controller 50 can determine, based on the change in the voltage drop amount in the second resistor 153 described above, whether the charging unit is connected.

The voltage drop amount in the second resistor 153 differs depending on a case where nothing is connected to the pair of electric terminals 111*t* and a case where the external unit such as the charging unit or the atomization unit 120 is connected to the pair of electric terminals 111*t*. Accordingly, the first controller 50 can detect the connection of the external unit such as the charging unit or the atomization unit 120 by acquiring the voltage drop amount in the second resistor 153.

For example, when detecting a high-level voltage value at the second resistor 153, the first controller 50 can estimate that the charging unit is not connected to the connection terminal 111*t*. In addition, when detecting a low-level or a zero-level voltage value at the second resistor 153, the first controller 50 can estimate that the charging unit is connected to the connection terminal 111*t*.

More specifically, in a state where the charging unit is not connected to the connection terminal 111*t*, a current flows from the power source 10 to the first controller 50 via the first resistor 152 and the second resistor 153. Accordingly, since the voltage drop occurs in the second resistor 153 due to the current flowing through the second resistor 153, the first controller 50 detects a high-level voltage value at the second resistor 153. On the other hand, among the pair of electric terminals 111*t*, when a main negative busbar of the charging unit connected between the first resistor 152 and the second resistor 153 falls to the ground potential due to grounding, a portion between the first resistor 152 and the second resistor 153 falls to the ground potential due to the connection of the charging unit to the connection terminal 111*t*. Therefore, since the current does not flow through the second resistor 153 in a state where the charging unit is connected to the connection terminal 111*t*, the first controller 50 detects a low-level voltage value at the second resistor 153.

Instead of the aspect described above, the first controller 50 may detect the connection of the charging unit, for example, based on a change in potential difference between the pair of connection terminals 111*t*.

(Discharge Control of Power Source)

Figure 8:
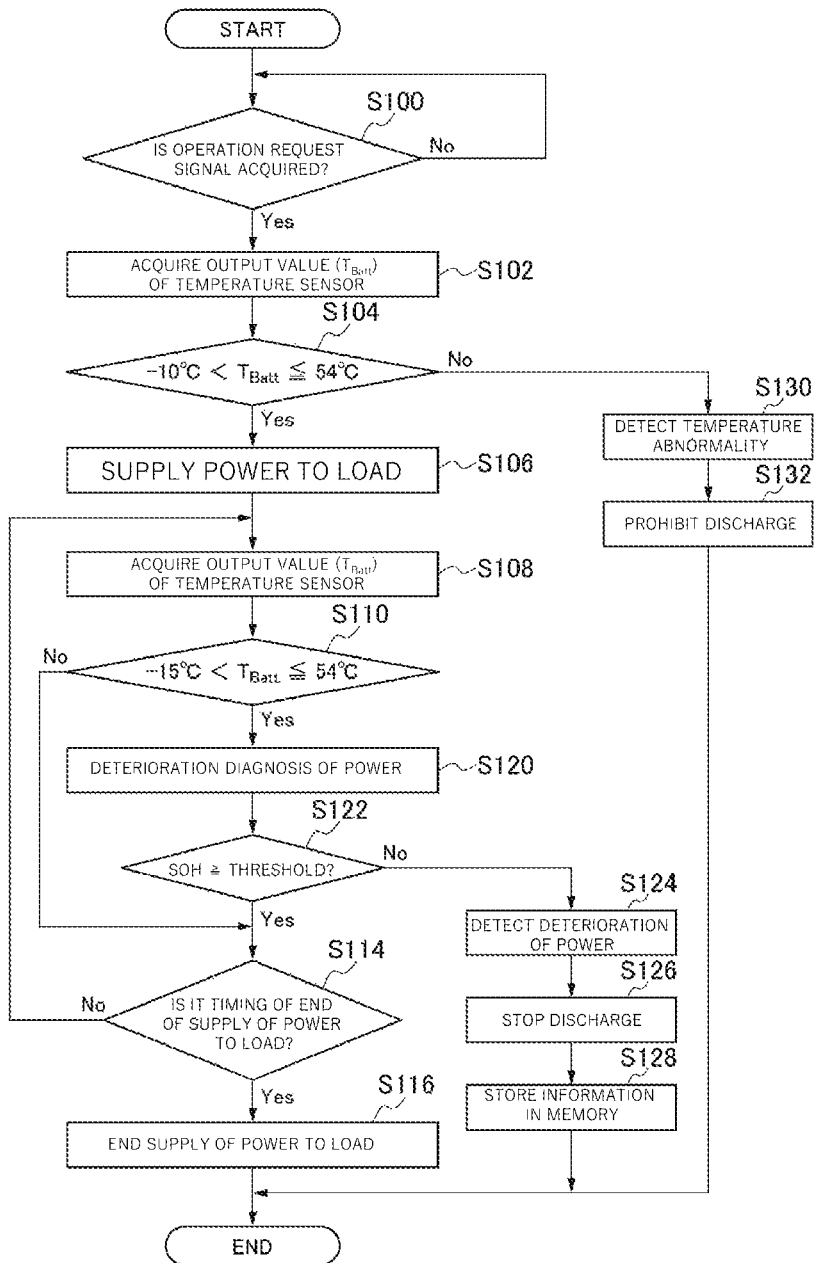
FIG. 8 is a flowchart illustrating a control flow in a discharge of the power source.

FIG. 8 is a flowchart illustrating a control flow in the discharge of the power source 10. Specifically, FIG. 8 illustrates a control flow relating to the supply of power from the power source 10 to the load 121R. Such a control flow is performed in a state where the atomization unit 120 is connected to the power source unit 110.

The first controller 50 stands by until the atomization unit 120 acquires an operation request signal for the load 121R in a state of being connected to the power source unit 110 (step S100). The operation request signal is input to the first controller 50 from the request sensor described above according to the user's operation. The request sensor may be the pressure sensor 20 or the push button 30 as described above. That is, in step S100, the first controller 50 detects a user's inhalation operation and a user's press against the push button 30.

When acquiring the operation request signal, the first controller 50 acquirers or estimates a value related to the temperature of the power source 10 (step S102). In an example illustrated in FIG. 8, the temperature itself of the power source 10 is acquired or estimated. More specifically, the first controller 50 acquires the output value (temperature) of the temperature sensor 160.

Next, the first controller 50 determines whether the output value of the temperature sensor 160 is within a range having at least one of an upper limit and a lower limit (step S104). Such a range preferably includes normal temperature. The normal temperature may be, for example, in the range of 15° C. to 25° C. (the same is applicable below). In the example illustrated in FIG. 8, the first controller 50 determines whether the output value of the temperature sensor 160 is within a range of −10° C. to 54° C.

Next, the first controller 50 executes one or more functions of operating the power source 10 when the output value of the temperature sensor 160 is within the range described above. Here, the one or more functions of operating the power source 10 includes a discharge of the power source 10. More specifically, the first controller 50 starts to supply the power to the load 121R from the power source 10 (step S106). Thus, aerosol is generated from the aerosol source.

The power is preferably supplied in the form of a power pulse from the power source 10 to the load 121R. In this case, the first controller 50 can control the amount of power (the amount of power per unit time value) supplied to the load 121R by adjusting a duty ratio of the power pulse.

When the load 121R is a heater, the temperature of the load 121R can be controlled by a known feedback control. Specifically, the first controller 50 preferably supplies the power to the load 121R in the form of pulses caused by pulse width modulation (PWM) or pulse frequency modulation (PFM), from the power source 10. In the feedback control, the first controller 50 may measure or estimate the temperature of the load 121R, and control the power to be supplied to the load 121R, for example, the duty ratio described above, based on a difference between the measured or estimated temperature of the load 121R and a target temperature. The feedback control may be, for example, a PID control.

The temperature of the load 121R can be measured or estimated by the temperature sensor placed near the load 121R. Alternatively, the temperature of the load 121R can be estimated by measurement or estimation of the electric resistance value of the load 121R. This is because the electric resistance value of the load 121R changes according to the temperature. The electric resistance value of the load 121R can be estimated by measurement of the voltage drop amount at the load 121R, for example. The voltage drop amount at the load 121R can be measured by the voltage sensor that measures the potential difference applied to the load 121R.

When the output value of the temperature sensor 160 is not within the range described above, the first controller 50 determines that the temperature of the power source 10 is abnormal (step S130). When the temperature abnormality of the power source 10 is detected in this way, the first controller 50 prohibits the discharge of the power source 10 (step S132). The discharge of the power source 10 can be prohibited by the open of the first switch 172, for example.

When the first controller 50 starts to supply the power to the load 121R (step S106), the first controller 50 acquires or estimates a value related to the temperature of the power source 10 (step S108). In the example illustrated in FIG. 8, the temperature itself of the power source 10 is acquired or estimated. More specifically, the first controller 50 acquires the output value (temperature) of the temperature sensor 160.

Subsequently, the first controller 50 determines whether the output value of the temperature sensor 160 is within the range having at least one of the upper limit and the lower limit (step S110). Such a range preferably includes normal temperature. In the example illustrated in FIG. 8, the first controller 50 determines whether the output value of the temperature sensor 160 is within the range of 15° C. to 54° C. The output value of the temperature sensor 160 used in step S110 may use the value acquired in step S102. In this way, the process of step S108 can be omitted.

In step S110, when the output value of the temperature sensor 160 is within the range described above, the first controller 50 starts deterioration diagnosis of the power source 10. In FIG. 8, state of health (SOH) is used as an example of the deterioration diagnosis of the power source 10. The SOH is defined by a value obtained by dividing the present full charge capacity of the power source 10 by the initial full charge capacity of the power source. The SOH can be estimated by a known method. For example, the first controller 50 can acquire or estimate the deterioration state (SOH) of the power source 10, based on the integrated value of the current flowing out from the power source 10, the integrated value of the current flowing into the power source 10, impedance, and the temperature measured using the temperature sensor 160 (step S120).

Next, the first controller 50 determines whether the acquired or estimated SOH is equal to or more than a predetermined threshold (step S122). When the acquired or estimated SOH is less than the predetermined threshold, the first controller 50 determines that the power source 10 has deteriorated (step S124). In this case, the first controller 50 stops the discharge of the power source 10, and stores information, which is that the power source 10 has deteriorated, in a memory (steps S126 and S128). The discharge of the power source 10 can be stopped by the open of the first switch 172, for example. In addition, the first controller 50 may notify the user of the fact that the abnormality of the power source 10 has occurred, via the notification unit 40. The charge may also be prohibited by the open of the second switch 174 in addition to the first switch 172.

When the acquired or estimated SOH is equal to or more than the predetermined threshold, it is determined that the power source 10 has not deteriorated, and the process proceeds to step S114. In step S110, when the output value of the temperature sensor 160 is not within the range described above, the first controller 50 does not diagnose the deterioration of the power source 10, and the process proceeds to step S114. In step S114, the first controller 50 determines whether it is the timing of the end of the supply of power to the load 121R.

The timing of the end of the supply of power to the load 121R may be defined by, for example, the timing at which the end of the user's inhalation operation is detected, the timing at which the release of the push button by the user is detected, or the timing when a predetermined period has elapsed from the start of the supply of power to the load 121R.

When determining that it is the timing of the end of the supply of power to the load 121R, the first controller 50 ends the supply of power to the load 121R (step S116). When the supply of power to the load 121R is ended, the first controller 50 again stands by until an operation request signal for the load 121R is acquired (step S100).

When determining that it is not the timing of the end of the supply of power to the load 121R, the first controller 50 continues to supply the power to the load 121R and acquires the output value of the temperature sensor 160 again (step S108). Then, the first controller 50 performs deterioration diagnosis of the power source 10 according to the output value of the temperature sensor 160 (steps S120 to S128). As described above, preferably, the first controller 50 repeats the deterioration diagnosis of the power source 10 according to the temperature of the power source 10 until the supply of power to the load 121R is ended. When the determination in step S114 is No (negative), steps S106 to S122 may be performed only once in one sequence by repetition of step S114. As another example, when the determination in step S114 is No (negative), the process may return to step S102 to determine again whether the power source 10 is abnormal in temperature.

(Charge Control of Power Source)

Figure 9:
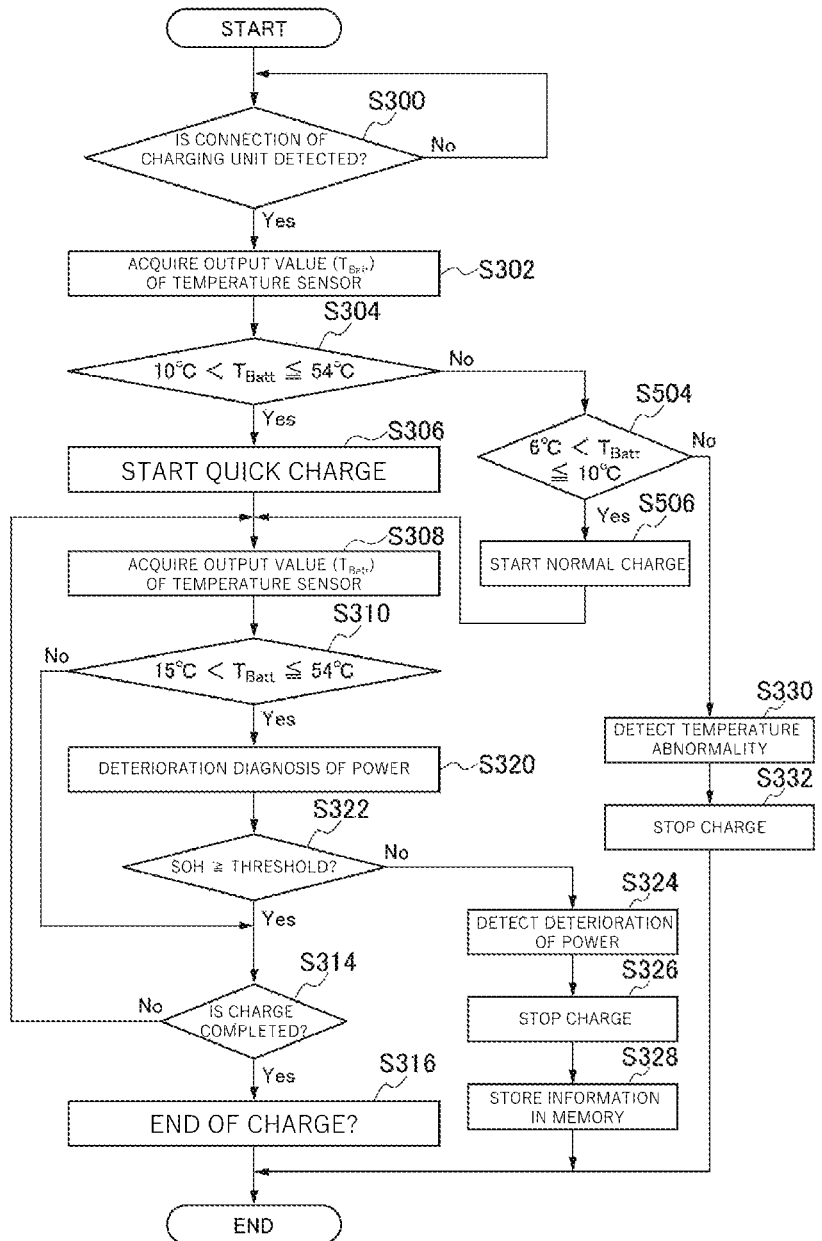
FIG. 9 is a flowchart illustrating a control flow in a charge of the power source.

FIG. 9 is a flowchart illustrating a control flow in the charge of the power source 10. Such a control flow in FIG. 9 is performed in a state where an external charging unit is connected to the power source unit 110.

The first controller 50 determines whether the charging unit is connected to the power source unit 110 (step S300). The first controller 50 stands by until the charging unit 200 is connected to the power source unit 110.

When the charging unit 200 is connected to the power source unit 110, the first controller 50 acquirers or estimates a value related to the temperature of the power source 10 (step S302). In an example illustrated in FIG. 9, the temperature itself of the power source 10 is acquired or estimated. More specifically, the first controller 50 acquires the output value of the temperature sensor 160.

Next, the first controller 50 determines whether the output value of the temperature sensor 160 is within a range having at least one of an upper limit and a lower limit (step S304). Such a range preferably includes normal temperature. In the example illustrated in FIG. 9, the first controller 50 determines whether the output value of the temperature sensor 160 is within a range of 10° C. to 54° C.

When the output value of the temperature sensor 160 is within the range described above, the first controller 50 starts a quick charge (step S306). Here, the charging speed can be expressed using a C-rate. In general, the charging speed, at which the power source 10 is charged to a fully charged state from the discharge end state for one hour, can be represented by 1.0 C as a reference. In the quick charge, the charge may be performed at a charging rate of 2.0 C, for example. However, it should be noted that the C-rate in the quick charge is not limited to the above value.

The first controller 50 may include a conversion unit that can convert and output a power value or a current value of the charging current from the charging unit. Thus, the first controller 50 can convert the charging current from the charging unit into a desired power value or current value and supply the converted value to the power source 10. Therefore, the first controller 50 can switch between the quick charge and a normal charge which will be described below.

In step S304, when the output value of the temperature sensor 160 is not within the range having at least one of the upper limit and the lower limit, the first controller 50 determines whether the output value of the temperature sensor 160 is within another range having at least one of the upper limit and the lower limit (step S504). Such a range preferably includes normal temperature. In the example illustrated in FIG. 9, the first controller 50 determines in step S504 whether the output value of the temperature sensor 160 is within the range of 6° C. to 10° C.

When the output value of the temperature sensor 160 is within the other range, the first controller 50 starts a normal charge (step S506). Here, the normal charge may be a charge mode having a C-rate lower than the C-rate of the quick charge. In the normal charge, the charge is performed at a C-rate of 1.0 C, for example.

When the output value of the temperature sensor 160 is not within the range defined in step S504, the first controller 50 determines that power source 10 is abnormal in temperature (step S330). When the temperature abnormality of the power source 10 is detected in this way, the first controller 50 prohibits the charge of the power source 10 (step S332). The charge of the power source 10 can be prohibited by the open of the second switch 174, for example. In addition, the discharge may also be prohibited by the open of the first switch 172 in addition to the second switch 174.

When the quick charge or the normal charge is started (steps S306 and S506), the first controller 50 acquires or estimates a value related to the temperature of the power source 10 (step S308). In the example illustrated in FIG. 9, the temperature itself of the power source 10 is acquired or estimated. More specifically, the first controller 50 acquires the output value (temperature) of the temperature sensor 160.

Subsequently, the first controller 50 determines whether the output value of the temperature sensor 160 is within the range having at least one of the upper limit and the lower limit (step S310). Such a range preferably includes normal temperature. In the example illustrated in FIG. 9, the first controller 50 determines whether the output value of the temperature sensor 160 is within the range of 15° C. to 54° C. The output value of the temperature sensor 160 used in step S310 may use the value acquired in step S302. In this way, the process of step S308 can be omitted.

In step S310, when the output value of the temperature sensor 160 is within the range described above, the first controller 50 starts deterioration diagnosis of the power source 10 (step S320). In FIG. 9, state of health (SOH) is used as an example of the deterioration diagnosis of the power source 10. The deterioration diagnosis of the power source 10 is as described in steps S110 and S120.

The first controller 50 determines whether the acquired or estimated SOH is equal to or more than a predetermined threshold (step S322). When the acquired or estimated SOH is less than the predetermined threshold, the first controller 50 determines that the power source 10 has deteriorated (step S324). In this case, the first controller 50 stops the charge of the power source 10, and stores information, which is that the power source 10 has deteriorated, in a memory (steps S326 and S328). The charge of the power source 10 can be stopped by the open of the second switch 174, for example. In addition, the first controller 50 may notify the user of the fact that the abnormality of the power source 10 has occurred, via the notification unit 40.

When the acquired or estimated SOH is equal to or more than the predetermined threshold, it is determined that the power source 10 has not deteriorated, and the process proceeds to step S314. In step S310, when the output value of the temperature sensor 160 is not within the range described above, the first controller 50 does not diagnose the deterioration of the power source 10, and the process proceeds to step S314. In step S314, the first controller 50 determines whether the charge of the power source 10 is completed. The completion of the charge can be detected by monitoring of the magnitude of the charge current and the like. When determining that the charge of the power source 10 is completed, the first controller 50 may open the second switch 174 to stop the charge (step S316).

When determining that the charge of the power source 10 is not completed, the first controller 50 continues the charge and acquires the output value of the temperature sensor 160 again (step S308). Then, the first controller 50 performs deterioration diagnosis of the power source 10 according to the output value of the temperature sensor 160 (steps S320 to S328). As described above, preferably, the first controller 50 repeats the deterioration diagnosis of the power source 10 according to the temperature of the power source 10 until the charge is completed. When the determination in step S314 is No (negative), steps S308 to S322 may be performed only once in one sequence by repetition of step S314. As another example, when the determination in step 314 is No (negative), the process may return to step S302 to determine again whether the power source 10 is abnormal in temperature.

(Range of Value Related to Temperature for Each Function)

A relation between each function related to the operation and the temperature of the power source 10 will be described below with reference to FIG. 10.

As described above, the first controller 50 includes an execution step of one or more functions of operating the power source 10 when the output value of the temperature sensor 160 is within the first range having at least one of the upper limit and the lower limit. Here, the one or more functions of operating the power source 10 includes at least one of the discharge, the charge, and the deterioration diagnosis of the power source 10.

In steps S104 and S106 of FIG. 8, for example, the first controller 50 supplies (discharges) the power to the load 121R from the power source 10 when the output value of the temperature sensor 160 is within the first range. Since the remaining capacity of the power source 10 is reduced by the discharge, the discharge is a function of operating the power source 10.

In steps S304 and S306 of FIG. 9, further, the first controller 50 executes the quick charge of the power source 10 when the output value of the temperature sensor 160 is within another first range. In steps S504 and S506 of FIG. 9, the first controller 50 executes the normal charge of the power source 10 when the output value of the temperature sensor 160 is within another first range. Since the remaining capacity of the power source 10 increases due to the quick charge or the charge, the quick charge or the charge is a function of operating the power source 10.

In steps S110 and S120 of FIG. 8 and steps S310 and S320 of FIG. 9, further, the first controller 50 executes the deterioration diagnosis of the power source 10 when the output value of the temperature sensor 160 is within further another first range. Since the control of the power source 10 varies depending on the result of the deterioration diagnosis, the deterioration diagnosis is a function of operating the power source 10.

Here, the operating temperature of the power source 10 is normally set. Such an operating range may be an operating temperature (for example, operation guarantee range) that is set in advance for the power source (product) by the manufacturer of the power source.

In addition, the power source 10 such as a secondary battery is desirably used in a temperature range in which the power source 10 is prevented from being deteriorated, more specifically, in a temperature range in which the power source is deteriorated only by a factor that is the same as the normal temperature. For example, the power source 10 has not only deterioration (normal deterioration) caused by normal conditions but also deterioration (specific deterioration) caused by conditions (low temperature or high temperature conditions) different from normal conditions. Accordingly, the power source 10 is preferably used under conditions that do not cause such a specific deterioration. Examples of the specific deterioration include electrodeposition that can occur at low temperature and change in internal physical properties of the power source that can occur at high temperature. Details of the specific deterioration will be described below.

Furthermore, each function of operating the power source 10 described above may have an executable temperature range of the function.

From the above viewpoint, the temperature ranges defined in steps S104, S110, S304, S310, and S504 is normally decided based on a range (second range) which is a range of a value related to a temperature at which the deterioration of the power source is suppressed, a range of a value related to a temperature (temperature at which no specific deterioration occurs) at which the power source 10 is deteriorated only by a factor that is the same as the normal temperature, or a range corresponding to the operating temperature of the power source. Such a second range can be ideally decided based on the true temperature of the value related to the temperature of the power source 10 when the type of the power source 10 and the type of a function to be executed are determined.

In the embodiment, however, the upper limit (first upper limit) or the lower limit (first lower limit) of the temperature range (first range) defined in steps S104, S110, S304, S310, and S504 is smaller or larger than an upper limit (second upper limit) or a lower limit (second lower limit) of the second range which is the range of the value related to the temperature at which the deterioration of the power source is suppressed, the range of the value related to the temperature at which the power source 10 is deteriorated only by a factor that is the same as the normal temperature, or the range corresponding to the operating temperature of the power source. In the specification, the first range is defined by a range to be actually compared with the output value of the sensor in the control flow. Hereinafter, the upper limit of the first range may be referred to as a "first upper limit", and the lower limit of the first range may be referred to as a "first lower limit". Similarly, the upper limit of the second range may be referred to as a "second upper limit", and the lower limit of the second range may be referred to as a "second lower limit".

The deviation between the first range and the second range is preferably determined due to the deviation between the output value of the temperature sensor 160 and the true value of the temperature of the power source 10. For example, the output value of the temperature sensor 160 may include an error due to the accuracy of the temperature sensor 160. Examples of the error of the temperature sensor 160 may include a gain error, an offset error, and a hysteresis error. These errors may be obtained experimentally, or may be described in a spec sheet or a specification of the temperature sensor 160.

When the temperature sensor 160 is provided at a position away from the power source 10, the output value of the temperature sensor 160 may deviate from the true value of the temperature of the power source 10 due to heat loss from the power source 10 to the temperature sensor 160. Furthermore, when a heat source different from the power source 10 exists in the vicinity of the temperature sensor 160, the output value of the temperature sensor 160 may deviate from the true value of the temperature of the power source 10 due to the influence of heat from the heat source.

In the embodiment, depending on the deviation between the output value of the temperature sensor 160 and the true value of the temperature of the power source 10, the first upper limit or the first lower limit of the temperature range (first range) defined in steps S104, S110, S304, S310, and S504 may be set to be smaller or larger than the second upper limit or the second lower limit of the second range. As described above, the first controller 50 can execute each function within an appropriate temperature range by determining, based on the deviation between the output value of the temperature sensor 160 and the true value of the temperature of the power source 10, whether each function can be executed.

Here, the second upper limit of the second range may be defined by an upper limit of the operating temperature (recommended use temperature defined by the manufacturer) of the power source 10. Alternatively, the second upper limit of the second range may be defined by a temperature at which a change in structure or composition of the electrode or the electrolyte occurs in the power source 10. For example, the second upper limit of the second range may be 60° C. The change in structure or composition of the electrode or the electrolyte is an example of the specific deterioration described above. In addition, it should be noted that the second upper limit of the second range is not limited to 60° C., but may be selected, according to the type of the power source 10 and the like, preferably from a range of 40° C. to 80° C., more preferably from a range of 50° C. to 70° C., and further more preferably from a range of 55° C. to 65° C.

The first upper limit of the first range defined in steps S104, S110, S304, S310, and S504 is preferably smaller than the second upper limit of the second range. Thus, even when the output value of the temperature sensor 160 deviates in the direction of plus and minus from the true value of the temperature of the power source 10, the first controller 50 can execute the above functions only when the true value of the temperature of the power source 10 is within the second range. Therefore, since the deterioration of the power source 10 is suppressed even when the above functions are executed, the power source 10 can be used for a long time without being replaced with a new product, and thus an energy saving effect is obtained.

The difference between the second upper limit of the second range and the first upper limit of the first range may be about 6° C. to 10° C. Accordingly, the first upper limit may be, for example, 50° C. to 54° C. In an example illustrated in FIG. 10, the first upper limit of the first range has the same value even in any of the functions of the discharge, the charge, and the deterioration diagnosis of the power source. This is because avoidance of the change in structure or composition of the electrode or the electrolyte in the power source 10 is preferable under high temperature conditions even in any function.

The first upper limit of the first range may be different in each function. Since the deterioration of the power source is more influenced by the charge rather than the discharge, the first upper limit of the first range, in which execution of the normal charge or the quick charge is permitted, may be lower than 54° C. Preferably, the first upper limit of the first range, in which execution of the normal charge or the quick charge is permitted, may be 39° C. when the second upper limit of the second range is set to 45° C.

Figure 10:
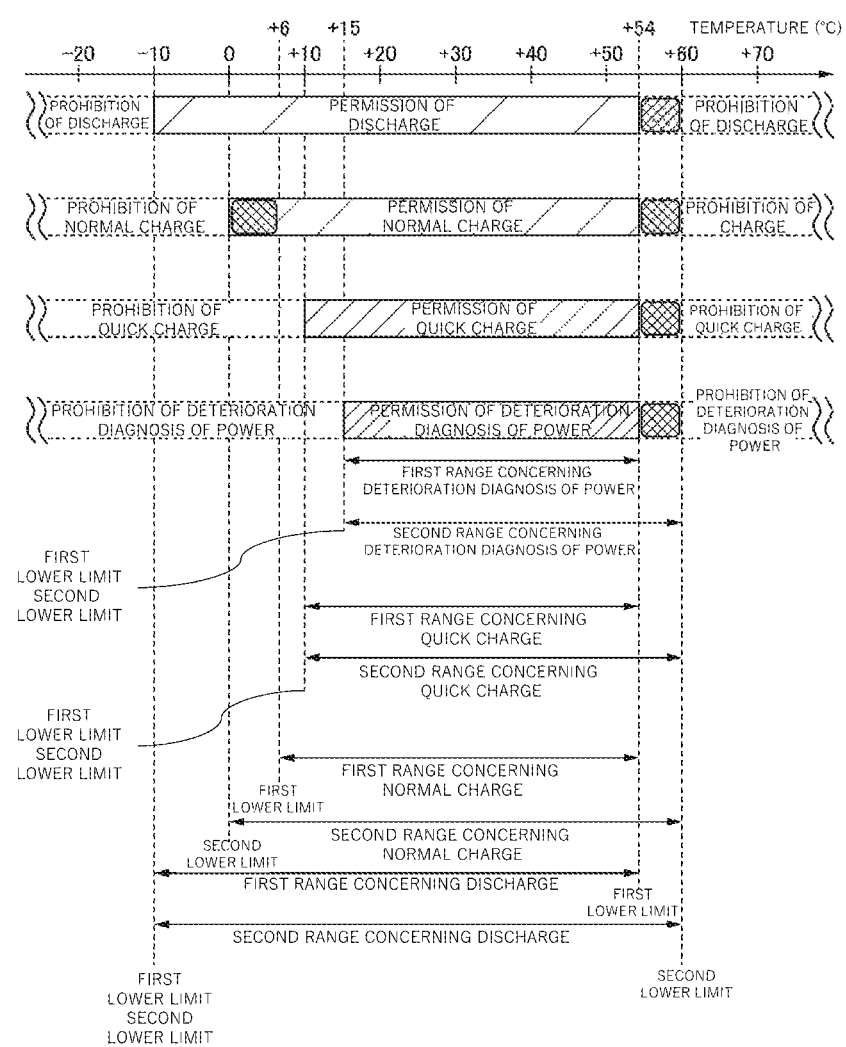
FIG. 10 is a diagram illustrating a temperature of the power source 10 and acceptance or rejection of execution of each function.

The difference between the second upper limit and the first upper limit is the same even in any of functions illustrated in FIG. 10. Alternatively, the difference between the second upper limit and the first upper limit may be the same in at least two functions. The difference between the second upper limit and the first upper limit is preferably determined according to the difference (maximum difference value) between the output value of the temperature sensor 160 and the true value of the temperature of the power source 10. From such a viewpoint, the difference between the second upper limit and the first upper limit is preferably the same in each function.

In addition, the first lower limit of the first range defined in steps S104, S110, S304, S310, and S504 is preferably larger than the second lower limit. Thus, even when the output value of the temperature sensor 160 deviates from the true value of the temperature of the power source 10, the first controller 50 can execute the above functions only when the true value of the temperature of the power source 10 is within the second range. Therefore, since the deterioration of the power source 10 is suppressed even when the above functions are executed, the power source 10 can be used for a long time without being replaced with a new product, and thus an energy saving effect is obtained.

In the example illustrated in FIG. 10, the first lower limit of the first range is different for each function of the discharge, the charge, or the deterioration diagnosis of the power source. Thus, the first range serving as a determination reference in the execution of each function differs for each function. Thus, the first controller 50 can determine whether or not to execute each function under the optimum condition for each function.

In the functions of discharging and charging the power source, the second lower limit of the second range may be defined by the lower limit of the operating temperature (recommended use temperature defined by the manufacturer) of the power source 10.

Alternatively, the second lower limit of the second range may be defined, in the discharge function of the power source, by a temperature at which an internal resistance may become excessive due to electrolyte solidification. In this case, for example, the second lower limit of the second range may be −10° C.

In the charge function of the power source, the second lower limit of the second range may be defined by a temperature at which a positive electrode material such as lithium can be deposited on the surface of the negative electrode by electrodeposition. In this case, for example, the second lower limit of the second range may be 0° C. In particular, the electrodeposition is likely to occur when the power source is charged. Therefore, the second lower limit of the second range is preferably 0° C. in the charge function in particular.

In the normal charge function of the power source, the absolute value of the difference between the second lower limit of the second range and the first lower limit of the first range may be about 6° C. to 10° C. That is, the first lower limit of the first range may be, for example, 6° C. to 10° C. in the normal charge function of the power source.

In the deterioration diagnosis function of the power source, the second lower limit of the second range is defined by a temperature range in which the deterioration diagnosis function of the power source is executable. Specifically, as described above, the deterioration of the power source is diagnosed using an amount such as SOH. Here, internal impedance of the power source may affect estimation of the amount such as SOH. When the power source 10 becomes low temperature, the internal impedance increases, and thus the amount such as SOH can hardly be accurately estimated at the low temperature. From such a viewpoint, the second lower limit of the second range may be set to 15° C., for example, in the deterioration diagnosis function of the power source. In the deterioration diagnosis function of the power source, the first lower limit of the first range may also be set to 15° C. in the same manner.

In the charge of the power source 10, particularly, in the normal charge function, the sign of the difference between the second upper limit and the first upper limit preferably differs from that of the difference between the second lower limit and the first lower limit. That is, when the second upper limit is larger than the first upper limit, the second lower limit is smaller than the first lower limit. Conversely, when the second upper limit is smaller than the first upper limit, the second lower limit is larger than the first lower limit. Most preferably, the second upper limit is larger than the first upper limit, and the second lower limit is smaller than the first lower limit. Thus, even when the output value of the temperature sensor 160 deviates in both direction of plus and minus from the true value of the temperature of the power source 10, the first controller 50 can charge the power source 10 only when the true value of the temperature of the power source 10 is within the second range. Therefore, since the deterioration of the power source 10 is suppressed even when the above function is executed, the power source 10 can be used for a long time without being replaced with a new product, and thus an energy saving effect is obtained.

At least one of the absolute value of the difference between the second upper limit and the first upper limit and the absolute value of the difference between the second lower limit and the first lower limit is preferably equal to or more than the maximum error value of the output value with respect to the input value of the temperature sensor 160.

More preferably, at least one of the absolute value of the difference between the second upper limit and the first upper limit and the absolute value of the difference between the second lower limit and the first lower limit is equal to or more than an absolute value of a difference between the output value of the temperature sensor 160 having no error and a value corresponding to the true value of the temperature of the power source 10.

When the power source 10 and the temperature sensor 160 are separated from each other, at least one of the absolute value of the difference between the second upper limit and the first upper limit and the absolute value of the difference between the second lower limit and the first lower limit is equal to or more than the amount of change corresponding to the temperature change (heat loss) until the temperature of the power source 10 is transmitted to the temperature sensor 160 or the electronic component in which the temperature sensor 160 is built. Accordingly, the first controller 50 can appropriately consider the difference between the output value of the temperature sensor 160 and the true value of the temperature of the power source 10 due to the heat loss.

More preferably, at least one of the absolute value of the difference between the second upper limit and the first upper limit and the absolute value of the difference between the second lower limit and the first lower limit is equal to or more than a value obtained by adding the amount of change corresponding to the temperature change (heat loss) until the temperature of the power source 10 is transmitted to the temperature sensor 160 or the electronic component or the absolute value of the difference between the output value of the temperature sensor 160 having no error and the value corresponding to the true value of the temperature of the power source 10 to the maximum error value of the output value with respect to the input value of the temperature sensor 160. Thus, the first controller 50 can consider both of the difference between the output value of the temperature sensor 160 and the true value of the temperature of the power source 10 due to the heat loss described above and the difference with the true value due to the error of the temperature sensor 160.

In the example illustrated in FIG. 10, the first lower limit of the first range is equal to the second lower limit of the second range in the functions of discharge, quick charge, and deterioration diagnosis of the power source. Alternatively, as in the normal charge, the first lower limit of the first range may be larger than the second lower limit of the second range in at least one of the functions of discharge, quick charge, and deterioration diagnosis of the power source. In this case, the difference between the second lower limit and the first lower limit may be the same in at least two functions of discharge, normal charge, quick charge, and deterioration diagnosis of the power source, and more preferably in all functions. When the absolute value of the difference between the first lower limit and the second lower limit is set to 6° C. as in the normal charge, it should be noted that the first lower limit for the discharge is −4° C., the first lower limit for the quick charge is 16° C., and the first lower limit for the deterioration diagnosis is 21° C.

The absolute value of the difference between the first lower limit and the second lower limit is the same as the absolute value of the difference between the first upper limit and the second upper limit in the embodiment described above, but both of the absolute values may be different from each other.

Second Embodiment (Discharge Control of Power Source)

A control flow in a discharge of a power source according to a second embodiment will be described below. In the following description, for the same configuration as that of the first embodiment, the description may be omitted.

Figure 11:
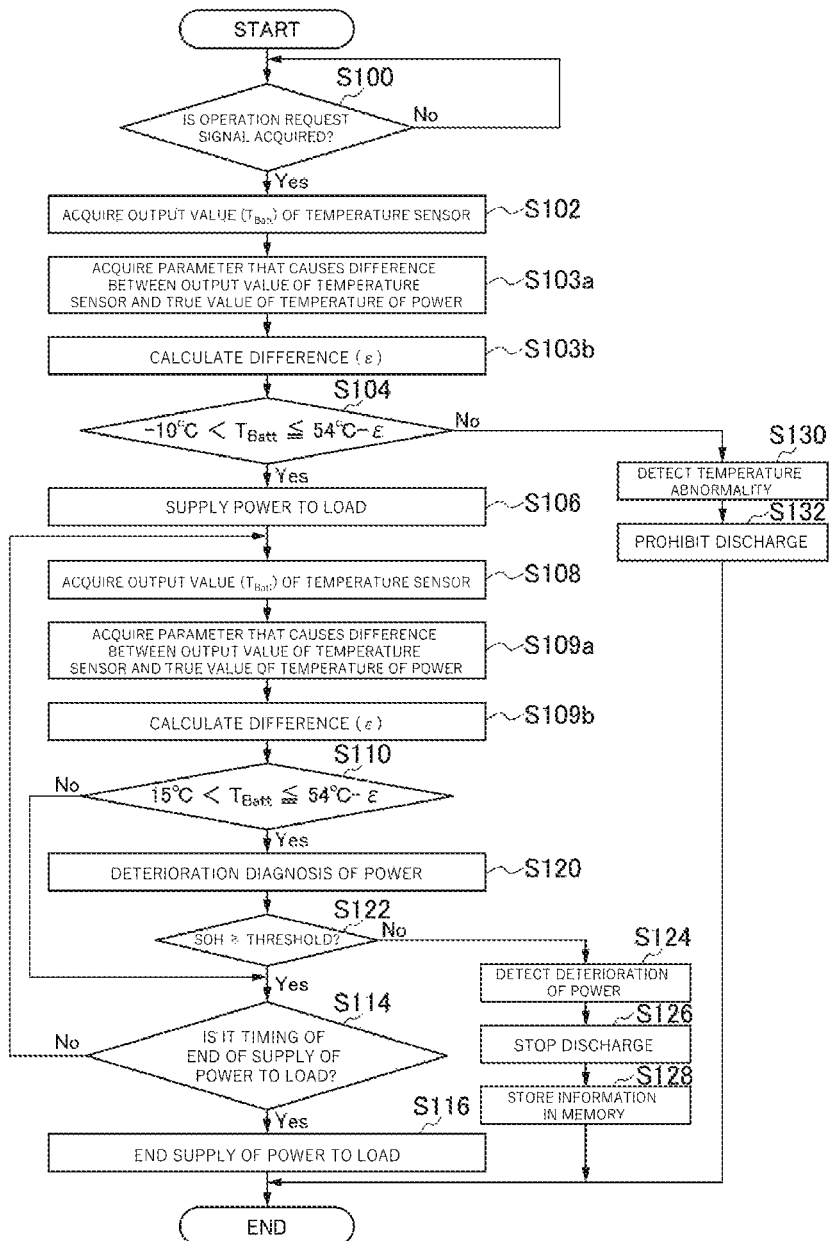
FIG. 11 is a flowchart illustrating a control flow in a discharge of a power source according to a second embodiment.

FIG. 11 is a flowchart illustrating the control flow in the discharge of the power source according to the second embodiment. The control flow in the discharge of the power source according to the second embodiment is substantially the same as the control flow (FIG. 8) according to the first embodiment. In the second embodiment, however, the upper limit (first upper limit) of the first range defined in steps S104 and S110 is variable.

Specifically, when acquiring an operation request signal (step S100) and acquiring an output value of a temperature sensor 160 (step S102), a first controller 50 acquires a parameter that causes a difference between the output value of the temperature sensor 160 and a true value of a temperature of a power source 10 (step S103*a*). Then, the first controller 50 calculates, from the acquired parameter, a difference ε between the output value of the temperature sensor 160 and the true value of the temperature of the power source 10 (step S103*b*).

Subsequently, the first controller 50 adjusts the difference between a second upper limit and a first upper limit based on the calculated difference ε. Specifically, the first controller 50 lowers the first upper limit used in the first embodiment by the calculated difference ε. Then, the first controller 50 determines in step S104 whether the output value of the temperature sensor 160 is within a new first range obtained in consideration of the difference ε(step S104). In this way, the first controller 50 makes the first range, in which whether the discharge of the power source 10 is performed is determined, variable according to the situation.

Similarly, the first controller 50 may acquire the parameter that causes a difference between the output value of the temperature sensor 160 and the true value of the temperature of the power source 10 (step S109*a*) even before diagnosis of deterioration of the power source 10 (step S120), thereby calculating the difference s, which can occur between the output value of the temperature sensor 160 and the true value of the temperature of the power source 10, from the acquired parameter (step S109*b*). In this case, the first controller 50 determines in step S110 whether the output value of the temperature sensor 160 is within a new first range obtained in consideration of the difference ε. In this way, the first controller 50 may make the first range, in which whether the deterioration diagnosis of the power source 10 is performed is determined, variable according to the situation.

Here, the difference ε that can occur between the output value of the temperature sensor 160 and the true value of the temperature of the power source 10 may be caused by, for example, the amount of heat to be lost while heat is transmitted from the power source 10 to the temperature sensor 160. In addition, when another heat source exists in the vicinity of the temperature sensor 160, the difference ε that can occur between the output value of the temperature sensor 160 and the true value of the temperature of the power source 10 may be influenced by heat transmitted to the temperature sensor 160 from another heat source.

In an example, the parameter that causes a difference between the output value of the temperature sensor 160 and the true value of the temperature of the power source 10 may be the temperature itself acquired by the temperature sensor 160. It is considered that the higher the temperature of the power source 10 is, the larger the amount of heat to be lost until heat is transmitted to the temperature sensor 160 from the power source 10 is. In this way, the difference s that can occur between the output value of the temperature sensor 160 and the true value of the temperature of the power source 10 can vary depending on the temperature of the temperature sensor 160. Accordingly, in this case, the first controller 50 may adjust the difference between the second upper limit and the first upper limit based on the output value of the temperature sensor 160.

In another example, the parameter that causes a difference between the output value of the temperature sensor 160 and the true value of the temperature of the power source 10 may be a calculation amount per predetermined time of the first controller 50. As the calculation amount per predetermined time of the first controller 50 increases, a heating amount of the first controller 50 increases. When the temperature sensor 160 is provided near the first controller 50 or inside the first controller 50, the output value of the temperature sensor 160 is influenced by heating of the first controller 50. Therefore, the difference that can occur between the output value of the temperature sensor 160 and the true value of the temperature of the power source 10 can vary depending on the calculation amount per predetermined time of the first controller 50. Accordingly, in this case, the first controller 50 may adjust the difference between the second upper limit and the first upper limit based on the calculation amount per predetermined time of the first controller 50.

The calculation amount per predetermined time of the first controller 50 may be obtained from, for example, the usage amount or usage rate of calculation resources of the first controller 50. As another example, calculation amount per predetermined time of the first controller 50 may be obtained from the content and number of functions to be controlled by the first controller 50.

In an example illustrated in FIG. 11, the first controller 50 is configured to make only the upper limit of the first range variable and to adjust the difference between the second upper limit and the first upper limit. Alternatively, the first controller 50 may be configured to make at least one of the upper limit and the lower limit of the first range variable and to adjust at least one of the difference between the second upper limit and the first upper limit and the difference between the second lower limit and the first lower limit. As to which of the upper limit or the lower limit of the first range to adjust, and the amount of adjustment, the relation between the parameter that causes a difference between the output value of the temperature sensor 160 and the true value of the temperature of the power source 10, the output value, and the true value may be suitably set in advance by an experiment.

As described above, the first controller 50 can execute the one or more functions of operating the power source 10 under more appropriate conditions by making the first range variable according to use environment and use situation.

(Charge Control of Power Source)

A control flow in a charge of the power source according to the second embodiment will be described below. In the following description, for the same configuration as that of the first embodiment, the description may be omitted.

Figure 12:
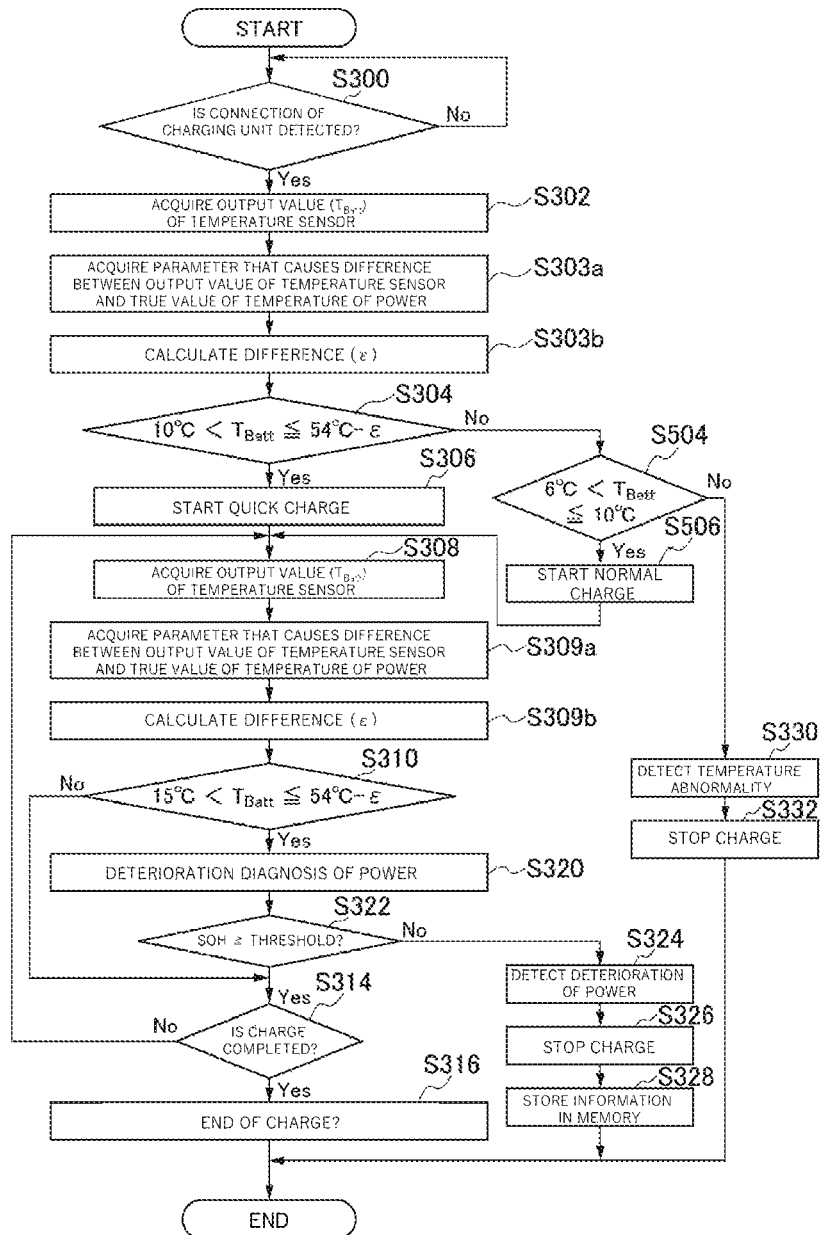
FIG. 12 is a flowchart illustrating a control flow in a charge of the power source according to the second embodiment

FIG. 12 is a flowchart illustrating the control flow in the charge of the power source according to the second embodiment. The control flow in the charge of the power source according to the second embodiment is substantially the same as the control flow (FIG. 9) according to the first embodiment. In the second embodiment, however, the first upper limit of the first range defined in steps S304 and S310 and the first lower limit of the first range defined in step S504 are variable.

Specifically, before steps S304 and S310, the first controller 50 acquires the parameter that causes the difference between the output value of the temperature sensor 160 and the true value of a temperature of the power source 10 (steps S303a and S309a), and calculates, from the acquired parameter, the difference c that can occur between the output value of the temperature sensor 160 and the true value of the temperature of the power source 10 (steps S303b and S309b).

Subsequently, the first controller 50 adjusts the first upper limit of the first range in step S304 or step S310 based on the calculated difference ε. Specifically, the first controller 50 lowers the first upper limit by the calculated difference c.

Then, the first controller 50 determines in steps S304 and S310 whether the output value of the temperature sensor 160 is within a new first range obtained in consideration of the difference c.

Similarly, the first controller 50 adjusts the first lower limit of the first range in step S504 based on the calculated difference c. Specifically, the first controller 50 increases the first lower limit by the calculated difference c. Then, the first controller 50 determines in step S504 whether the output value of the temperature sensor 160 is within a new first range obtained in consideration of the difference c.

As described above, the first controller 50 makes the first range, in which whether the charge of the power source 10 or the deterioration diagnosis of the power source is performed is determined, variable according to the situation. The first controller 50 can execute the one or more functions of operating the power source 10 under more appropriate conditions by making the first range variable according to use environment and use situation.

The parameter, which causes the difference between the output value of the temperature sensor 160 and the true value of the temperature of the power source 10, and the difference c are as described in the discharge control of the power source.

Third Embodiment

A third embodiment will be described below. In the third embodiment, for the same configuration as that of the first embodiment, the description thereof may be omitted.

Figure 13:
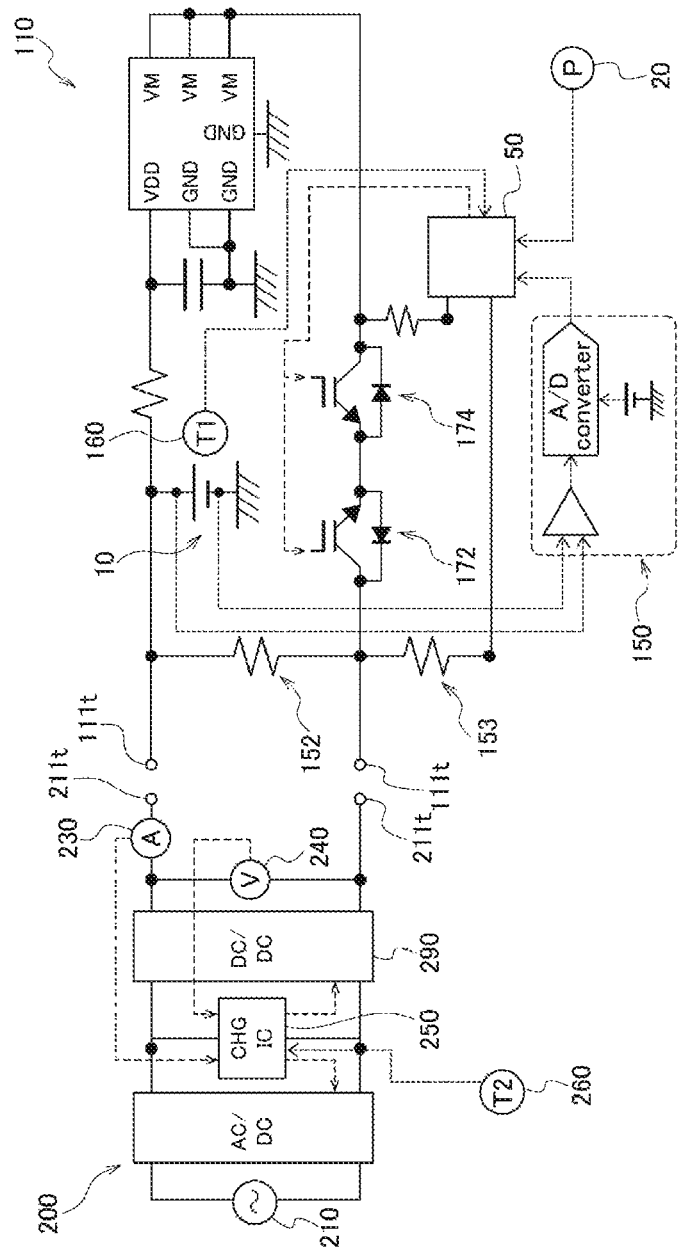
FIG. 13 is a diagram illustrating an electric circuit of a power source unit and a charging unit according to a third embodiment.
Figure 14:
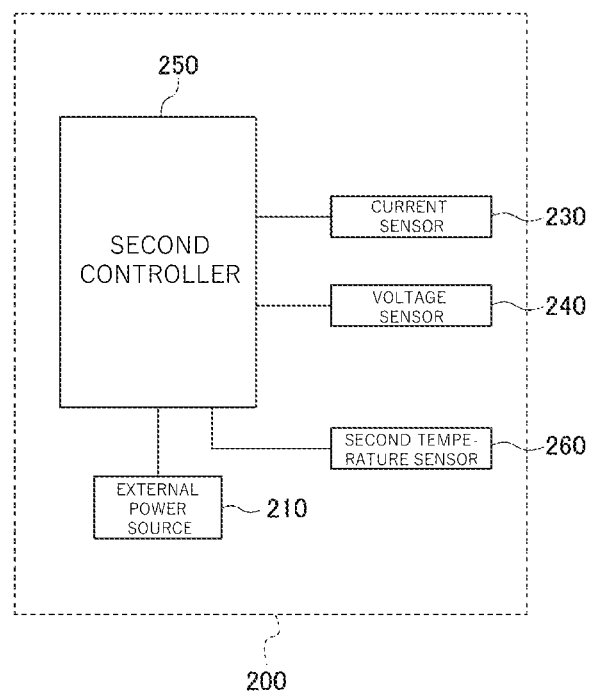
FIG. 14 is a block diagram of the charging unit.

FIG. 13 is a diagram illustrating an electric circuit of a power source unit and a charging unit according to the third embodiment. FIG. 14 is a block diagram of the charging unit. A power source unit 110 may have the same configuration as that of the first embodiment.

The power source unit 110 is configured to be connectable to a charging unit 200. When the charging unit 200 is connected to the power source unit 110, the charging unit 200 is electrically connected to a power source 10 of the power source unit 110. The charging unit 200 may include a current sensor 230, a voltage sensor 240, a second controller 250, and a second temperature sensor 260.

The charging unit 200 is electrically connected to the power source unit 110 by a pair of connection terminals 211t. A pair of electric terminals of the power source unit 110 used to electrically connect the charging unit 200 may be the same as a pair of electric terminals 111t of the power source unit 110 used to electrically connect a load 121R. Alternatively, the pair of electric terminals of the power source unit 110 used to electrically connect the charging unit 200 may be provided separately from the pair of electric terminal 111t.

When an external power source 210 is an AC power source, the charging unit 200 may include an inverter (AC/DC converter) that converts AC into DC. The current sensor 230 is a sensor that acquires a value of a charge current supplied from the charging unit 200 to the power source 10. The voltage sensor 240 is a sensor that acquires a voltage between the pair of electric terminals of the charging unit 200. In other words, the voltage sensor 240 acquires a potential difference applied between the pair of connection terminals 111t of the power source unit.

The second controller 250 is configured to control a charge for the power source 10. The second controller 250 may control the charge of the power source 10 using output values from the second temperature sensor 260, the current sensor 230 and/or the voltage sensor 240. The charging unit 200 may further include a voltage sensor that acquires DC voltage output from the inverter and a DC/DC converter that can increase and/or decrease a DC voltage output from the inverter or the external power source 210.

The charging unit 200 may include a conversion unit 290 that can convert a voltage or a current of the input power and output the converted voltage or current. The second controller 250 is configured to be adjustable the value of the voltage or current output from the conversion unit 290 by the operation of the conversion unit 290. Thus, the second controller 250 can adjust the charge current for charging the power source 10.

In the third embodiment, therefore, the second controller 250 of the charging unit 200 is responsible for switching between a quick charge and a normal charge. On the other hand, the first controller 50 of the power source unit 110 can select whether to accept or reject the charge by opening and closing a second switch 174. That is, even when the charging unit 200 is connected to the power source unit 110, the first controller 50 can temporarily or permanently stop the charge of the power source 10 using the second switch 174.

(Charge Control of Power Source)

Figure 15:
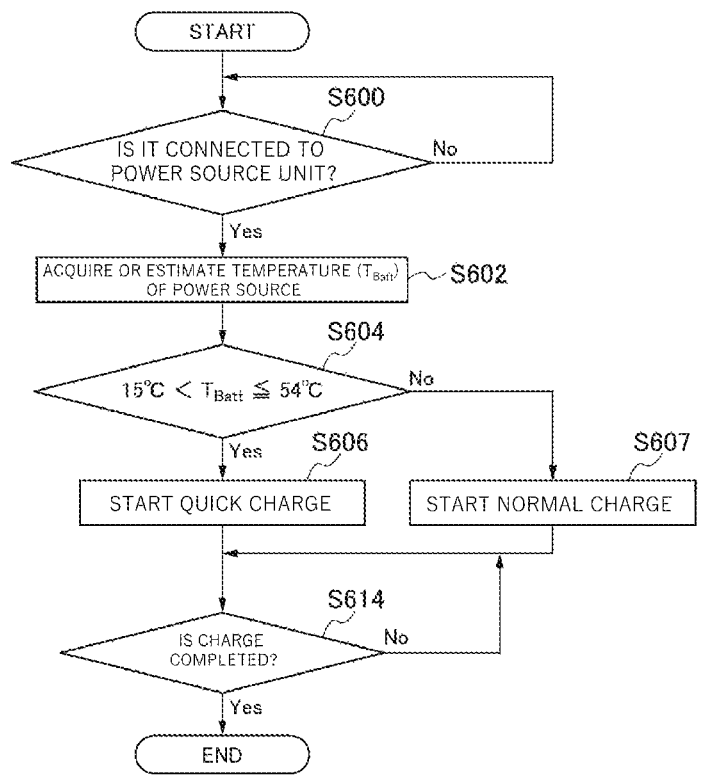
FIG. 15 is a flowchart illustrating a control flow on the side of the charging unit in a charge of a power source according to the third embodiment.

FIG. 15 is a flowchart illustrating a control flow on the side of the charging unit in the charge of the power source according to the third embodiment.

The second controller 250 of the charging unit determines whether the charging unit is connected to the power source unit 110 (step S600). The second controller 250 stands by until the charging unit is connected to the power source unit 110.

When the charging unit is connected to the power source unit 110, the second controller 250 acquires or estimates a value related to the temperature of the power source 10 (step S602). The value related to the temperature of the power source 10 may be a temperature of the power source 10. In this case, the second controller 250 may estimate the temperature of the power source 10 from the output value of the second temperature sensor 260.

Next, the second controller 250 determines whether the output value of the second temperature sensor 260 is within a range having at least one of an upper limit and a lower limit (step S604). Such a range preferably includes normal temperature. In the example illustrated in FIG. 15, the second controller 250 determines whether the output value of the second temperature sensor 260 is within a range of 15° C. to 54° C.

When the output value of the second temperature sensor 260 is within the above range, the second controller 250 starts a quick charge (step S606). Specifically, the second controller 250 supplies a current toward the power source unit 110 at a charging rate corresponding to the quick charge.

In step S604, when the output value of the temperature sensor 160 is not within the range having at least one of the upper limit and the lower limit, the second controller 250 starts a normal charge (step S607). Specifically, the second controller 250 supplies a current toward the power source unit 110 at a charging rate corresponding to the normal charge.

When determining that the charge is completed, the second controller 250 stops the supply of the current (step S614). The second controller 250 may determine that the charge is completed when the charge current becomes equal to or less than a charge completion current during constant voltage charging, for example.

Figure 16:
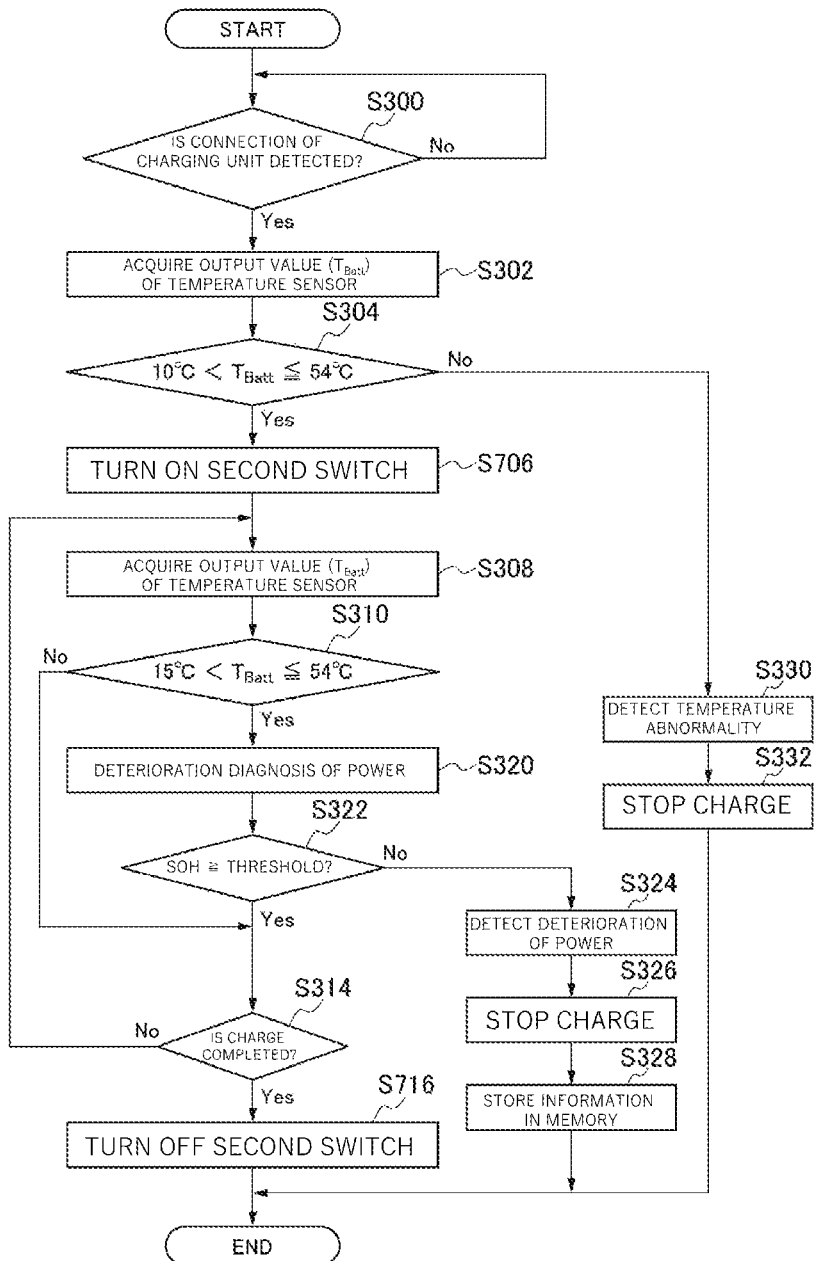
FIG. 16 is a flowchart illustrating a control flow on the side of the power source unit in the charge of the power source according to the third embodiment.

FIG. 16 is a flowchart illustrating a control flow on the side of the power source unit in the charge of the power source according to the third embodiment. The first controller 50 of the power source unit 110 determines whether the charging unit is connected to the power source unit 110 as in the first embodiment (step S300). The first controller 50 stands by until the charging unit 200 is connected to the power source unit 110.

When the charging unit 200 is connected to the power source unit 110, the first controller 50 acquires the output value of the temperature sensor 160 as in the first embodiment, and determines whether the output value of the temperature sensor 160 is within the range having at least one of the upper limit and the lower limit (steps S302 and S304).

When the output value of the temperature sensor 160 is within the above range, the first controller 50 closes the second switch 174 (step S704). Thus, the charge current can reach the power source 10 from the charging unit 200.

In step S304, when the output value of the temperature sensor 160 is not within the range having at least one of the upper limit and the lower limit, the first controller 50 determines that the power source 10 is abnormal in temperature (step S330). When the temperature abnormality of the power source 10 is detected in this way, the first controller 50 prohibits the charge of the power source 10 (step S332). The charge of the power source 10 can be prohibited by the open of the second switch 174, for example.

When the quick charge or the normal charge is started, the first controller 50 acquires or estimates a value related to the temperature of the power source 10, and performs deterioration diagnosis of the power source as necessary (steps S308, S310, S320, S322, S324, S326, and S328). These steps are the same as in the first embodiment.

In the embodiment, the first controller 50 opens the second switch 174 when determining that the charge of the power source is completed. This prevents the charge current from reaching the power source 10 from the charging unit.

In the embodiment, as described above, the first controller 50 of the power source unit 110 and the second controller 250 of the charging unit 200 execute jointly the function of charge. Even in this case, the first controller 50 and/or the second controller 250 may be configured to execute one or more functions of operating the power source when the output value of the temperature sensor 160 and 260 is within a first range having at least one of a first upper limit and a first lower limit. In this case, the first upper limit or the first lower limit of the first range may be smaller or larger than a second upper limit or a second lower limit of a second range which is a range of a value related to a temperature at which the one or more functions can be executed, a range of a value related to a temperature at which the deterioration of the power source is suppressed, a range of a value related to a temperature at which the power source is deteriorated only by a factor that is the same as the normal temperature, or a range corresponding to the operating temperature of the power source. That is, the upper limit and/or the lower limit of the temperature range in step S604 of FIG. 15 and steps S304 S310 of FIG. 16 may be set as described above in the section of "Range of, Value Related to Temperature for Each Function".

In the third embodiment, the upper limit and/or the lower limit of the temperature range in step S604 of FIG. 15 and steps S304 and S310 of FIG. 16 may be configured to be variable as described in the second embodiment.

(Program and Storage Medium)

The first controller 50 or the second controller 250 can execute any control flow described above, more specifically, the control flows described with reference to FIGS. 8, 9, 11, 12, 15, and 16. That is, the first controller 50 or the second controller 250 may include a program that causes a computer mounted on a device such as the aerosol generating device, the power source unit, or the charging unit to execute the above-described method. Such a program may be stored in a computer-readable storage medium. The storage medium may be a non-transitory medium, for example.

Other Embodiments

Although the invention has been described with reference to the above-described embodiments, it should not be understood that the invention is limited to the description and drawings constituting a part of the disclosure. From the disclosure, various alternative embodiments, examples, and operational techniques will be apparent to those skilled in the art.

In the embodiments described above, for example, the aerosol generating device 100 includes both the aerosol source for generating the aerosol and the flavor source including the tobacco raw material and/or the extracts derived from the tobacco raw material for generating the flavor ingredient. Alternatively, the aerosol generating device 100 may include only one of the aerosol source and the flavor source.

In the aerosol generating device described above, the power source unit 110 and the atomization unit 120 are configured to be separable from each other. Alternatively, the power source unit 110 and the atomization unit 120 may be configured integrally with each other.

In the embodiments described above, the temperature itself of the power source 10 is used as the value related to the temperature of the power source 10. Therefore, the temperature sensor 160 or 260 is used as a sensor that outputs the value related to the temperature. Alternatively, the value related to the temperature may be a physical quantity different from the temperature, for example, a physical quantity that can be converted into temperature. The physical quantity that can be converted into temperature may be, for example, an electric resistance value of the resistor (provided near the power source) or a voltage drop amount (potential difference) in the resistor. In this case, the sensor that outputs the value related to the temperature of the power source may be a sensor that measures the electric resistance value of the electric resistor provided near the power source or a voltage sensor that measures a voltage drop amount in the electric resistor.

What is claimed is:

1. A control unit for an aerosol generating device, comprising:
   a sensor that outputs a value related to a temperature of a lithium-ion secondary battery that is a power source capable of being charged and discharged to a load for atomizing an aerosol source; and
   a controller configured to execute one or more functions of operating the power source when an output value of the sensor is within a first range having a first upper limit and a first lower limit, wherein
   the first upper limit is smaller than a second upper limit of a second range having the second upper limit and a second lower limit, and the first lower limit is equal to or larger than the second lower limit, wherein the second range is a range of a value related to a temperature at which the one or more functions can be executed, a range of a value related to a temperature at which deterioration of the power source is suppressed, a range of a value related to a temperature at which the power source deteriorates due only to a factor that is the same as normal temperature, or a range corresponding to an operating temperature of the power source.

2. The control unit for an aerosol generating device according to claim 1, wherein
   the first range includes the first lower limit, and
   the first lower limit is larger than the second lower limit.

3. The control unit for an aerosol generating device according to claim 1, wherein
   at least one of an absolute value of a difference between the second upper limit and the first upper limit and an absolute value of a difference between the second lower limit and the first lower limit is equal to or larger than a maximum error value of an output value with respect to an input value of the sensor.

4. The control unit for an aerosol generating device according to claim 1, wherein
   the controller is configured to adjust at least one of the first upper limit and the first lower limit based on a varying parameter that causes a difference between the output value of the sensor and a true value of the temperature of the power source such that the first range does not go beyond the second range.

5. The control unit for an aerosol generating device according to claim 1, wherein
   the sensor is disposed in or near an electronic component that is provided separately from the power source, and
   a distance between the sensor and the electronic component is shorter than a distance between the sensor and the power source.

6. The control unit for an aerosol generating device according to claim 5, wherein
   at least one of the absolute value of a difference between the second upper limit and the first upper limit and the absolute value of a difference between the second lower limit and the first lower limit is equal to or larger than an amount of change corresponding to a temperature change until the temperature of the power source is transmitted to the sensor or the electronic component.

7. The control unit for an aerosol generating device according to claim 5, wherein
   at least one of the absolute value of a difference between the second upper limit and the first upper limit and the absolute value of a difference between the second lower limit and the first lower limit is equal to or larger than an absolute value of a difference between the output value of the sensor and a value corresponding to a true value of the temperature of the power source.

8. The control unit for an aerosol generating device according to claim 5, wherein
   at least one of the absolute value of a difference between the second upper limit and the first upper limit and the absolute value of a difference between the second lower limit and the first lower limit is equal to or larger than a value obtained by adding an amount of change corresponding to a temperature change until the temperature of the power source is transmitted to the sensor or the electronic component, or an absolute value of a difference between the output value of the sensor and a value corresponding to a true value of the temperature of the power source to the maximum error value of the output value with respect to an input value of the sensor.

9. The control unit for an aerosol generating device according to claim 5, wherein the electronic component is the controller, and
the controller is configured to adjust at least one of a difference between the second upper limit and the first upper limit and a difference between the second lower limit and the first lower limit, based on a calculation amount per predetermined time of the controller.

10. The control unit for an aerosol generating device according to claim 5, wherein
the controller is configured to adjust at least one of a difference between the second upper limit and the first upper limit and a difference between the second lower limit and the first lower limit, based on the output value of the sensor.

11. The control unit for an aerosol generating device according to claim 1, wherein
the one or more functions includes at least one of a discharge, a charge, and deterioration diagnosis of the power source.

12. The control unit for an aerosol generating device according to claim 1, wherein
the second upper limit is a temperature at which a change in structure or composition of an electrode or an electrolyte occurs in the power source.

13. The control unit for an aerosol generating device according to claim 1, wherein
the one or more functions includes at least one of a discharge and deterioration diagnosis of the power source, and
the second upper limit is 60° C.

14. The control unit for an aerosol generating device according to claim 1, wherein
the one or more functions includes at least one of a discharge and deterioration diagnosis of the power source, and
the first upper limit is 54° C.

15. The control unit for an aerosol generating device according to claim 1, wherein
the one or more functions is to charge the power source, and
the second upper limit is 45° C.

16. The control unit for an aerosol generating device according to claim 1, wherein
the one or more functions is to charge the power source, and
the first upper limit is 39° C.

17. The control unit for an aerosol generating device according to claim 1, wherein
the one or more functions is to charge the power source, and
the second lower limit is a temperature at which electrodeposition occurs in the power source.

18. The control unit for an aerosol generating device according to claim 1, wherein
the one or more functions is to charge the power source, and
the second lower limit is 0° C.

19. The control unit for an aerosol generating device according to claim 1, wherein
the one or more functions is to charge the power source, and
the first lower limit is 6° C.

20. The control unit for an aerosol generating device according to claim 1, wherein
the one or more functions includes at least one of a discharge and deterioration diagnosis of the power source, and
the second lower limit is −10° C.

21. The control unit for an aerosol generating device according to claim 1, wherein
the one or more functions includes at least one of a discharge and deterioration diagnosis of the power source, and
the first lower limit is −4° C.

22. The control unit for an aerosol generating device according to claim 1, wherein
the controller is configured to be capable of executing a plurality of the functions, and
the first range is different for each of the functions.

23. The control unit for an aerosol generating device according to claim 1, wherein
the controller is configured to be capable of executing a plurality of the functions, and
at least one of the first upper limit, the first lower limit, the second upper limit, the second lower limit, a difference between the second upper limit and the first upper limit, and a difference between the second lower limit and the first lower limit are the same in a plurality of the functions.

24. An aerosol generating device comprising:
the control unit according to claim 1;
the load that atomizes the aerosol source.

25. A method comprising:
acquiring or estimating a value related to a temperature of a lithium-ion secondary battery that is a power source capable of being charged and discharged to a load for atomizing an aerosol source; and
executing one or more functions of operating the power source when the value related to the temperature of the power source is within a first range having a first upper limit and a first lower limit, wherein
the first upper limit is smaller than a second upper limit of a second range having the second upper limit and a second lower limit, and the first lower limit is equal to or larger than the second lower limit, wherein the second range is a range of a value related to a temperature at which the one or more functions can be executed, a range of a value related to a temperature at which deterioration of the power source is suppressed, a range of a value related to a temperature at which the power source deteriorates due only to a factor that is the same as normal temperature, or a range corresponding to an operating temperature of the power source.

26. A non-transitory computer-readable storage medium storing a program for causing a computer to execute the method according to claim 25.

* * * * *

UNITED STATES PATENT AND TRADEMARK OFFICE
CERTIFICATE OF CORRECTION

PATENT NO. : 10,632,488 B1
APPLICATION NO. : 16/571964
DATED : April 28, 2020
INVENTOR(S) : Takashi Oda et al.

Page 1 of 1

It is certified that error appears in the above-identified patent and that said Letters Patent is hereby corrected as shown below:

On the Title Page

Please add the following publication information:
--(65)  Prior Publication Data
US 2020/0108409 A1    Apr. 9, 2020--.

Signed and Sealed this
Eighteenth Day of August, 2020

Andrei Iancu
*Director of the United States Patent and Trademark Office*